United States Patent
Matsumura

(10) Patent No.: US 6,636,330 B2
(45) Date of Patent: *Oct. 21, 2003

(54) IMAGE DISPLAY APPARATUS OR IMAGE PRINTING APPARATUS

(75) Inventor: Koichi Matsumura, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/724,541

(22) Filed: Sep. 30, 1996

(65) Prior Publication Data
US 2002/0063869 A1 May 30, 2002

(30) Foreign Application Priority Data
Oct. 4, 1995 (JP) ............................. 07-257925

(51) Int. Cl.⁷ ............................................... G06F 15/00
(52) U.S. Cl. ........................ 358/1.2; 358/487; 345/115
(58) Field of Search ................................ 395/102, 112, 395/114, 115, 117; 348/96, 239, 333, 581, 588; 345/115, 126, 127; 358/1.2, 1.13, 1.15, 1.16, 1.18, 474, 475, 487, 494

(56) References Cited

U.S. PATENT DOCUMENTS

| | | | | |
|---|---|---|---|---|
| 4,710,821 A | * | 12/1987 | Ohta | 358/296 |
| 4,920,571 A | * | 4/1990 | Abe et al. | 358/428 |
| 5,189,439 A | * | 2/1993 | Yumoto et al. | 347/115 |
| 5,633,733 A | * | 5/1997 | Miyazawa | 358/527 |
| 5,710,572 A | * | 1/1998 | Nihei | 345/115 |
| 5,724,160 A | * | 3/1998 | Brandestini et al. | 358/475 |
| 5,774,248 A | * | 6/1998 | Komatsu | 359/204 |
| 5,867,279 A | * | 2/1999 | Funamizu et al. | 358/296 |

\* cited by examiner

Primary Examiner—Mark Wallerson
(74) Attorney, Agent, or Firm—Robin, Blecker & Daley

(57) ABSTRACT

An image display/printing apparatus includes a scanning device capable of scanning a plurality of images recorded on a recording medium, a memory capable of storing data of the plurality of images scanned by the scanning device, a display or printing circuit arranged to process, for providing a display or for printing, the data of the plurality of images stored in the memory, and a varying circuit arranged to vary a scanning resolution to be employed by the scanning device, the varying circuit being arranged to vary the scanning resolution according to the number of images to be displayed on one screen by the display circuit or to be printed on one sheet by the printing circuit.

42 Claims, 18 Drawing Sheets

F I G. 1
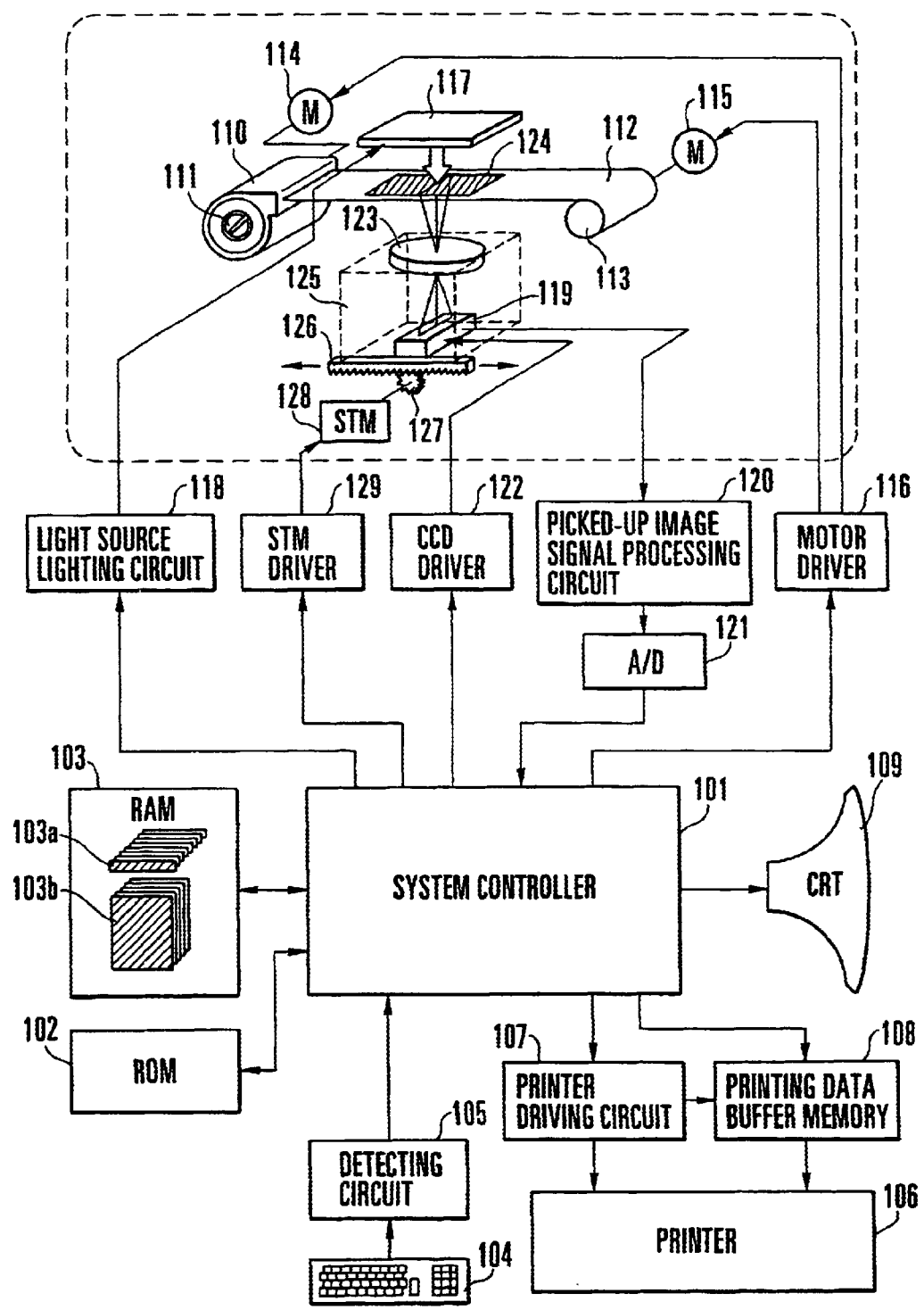

F I G. 3
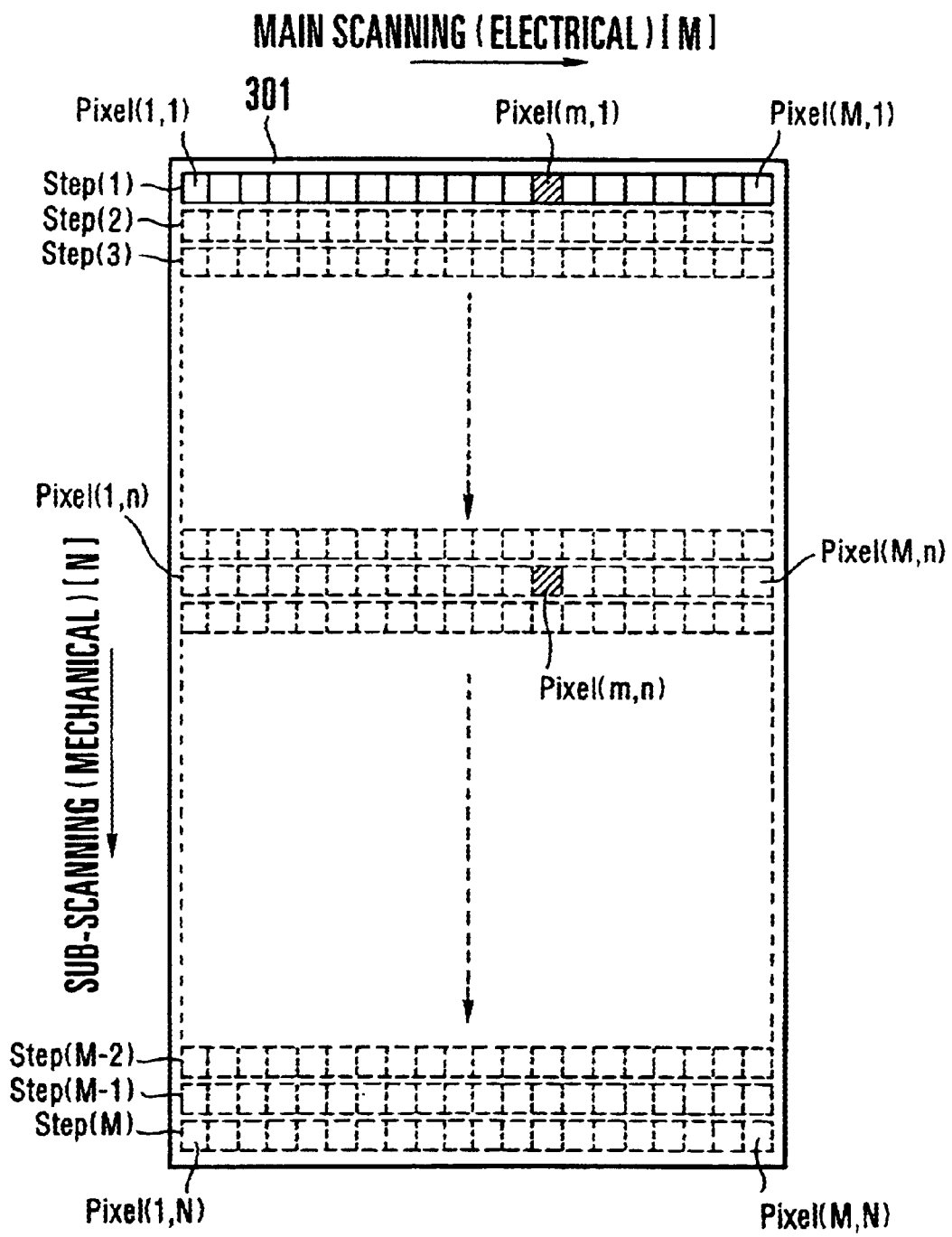

Template2

Template3

FIG. 21

| No. | NUMBER OF FRAMES OF IMAGE DATA | IMAGE POSITION AND IMAGE SIZE |
|---|---|---|
| Template1 | 9 | T1-1/9(a1,b1-M/3,N/3) |
| | | T1-2/9(a2,b1-M/3,N/3) |
| | | T1-3/9(a3,b1-M/3,N/3) |
| | | T1-4/9(a1,b2-M/3,N/3) |
| | | T1-5/9(a2,b2-M/3,N/3) |
| | | T1-6/9(a3,b2-M/3,N/3) |
| | | T1-7/9(a1,b3-M/3,N/3) |
| | | T1-8/9(a2,b3-M/3,N/3) |
| | | T1-9/9(a3,b3-M/3,N/3) |
| Template2 | 4 | T2-1/4(a4,b4-M/2,N/2) |
| | | T2-2/4(a5,b4-M/2,N/2) |
| | | T2-3/4(a4,b5-M/2,N/2) |
| | | T2-4/4(a5,b5-M/2,N/2) |
| Template3 | 1 | T3-1/1(a6,b6-M,N) |

# IMAGE DISPLAY APPARATUS OR IMAGE PRINTING APPARATUS

BACKGROUND OF THE INVENTION

1. Field of the Invention

This invention relates to an image display apparatus arranged to scan images recorded on a film and display the scanned images, or an image printing apparatus arranged to print the scanned images.

2. Description of Related Art

An image display apparatus for scanning an image recorded on a film and displaying the scanned image is arranged, for example, as disclosed in Japanese Laid-Open Patent Application No. HEI 3-274047, to scan the image recorded on the film by using an image sensor such as a CCD and to display image data corresponding to the scanned image on a CRT (cathode-ray tube) or print the image data on a printing paper. According to the disclosed image display apparatus, the position of an image on the printing paper is automatically decided by detecting the direction of the image. In such an apparatus, the higher the image scanning resolution, the sharper the image displayed on the CRT or printed on the printing paper becomes. It is, therefore, preferable to increase the image scanning resolution for an ordinary viewing display.

Meanwhile, some of the image display apparatuses are arranged to permit selection of a desired display size of the image, and some of the image display apparatuses are capable of displaying a multiplicity of small-sized images on a single picture plane or on a single printing paper to be used as indexes for the images recorded on the film.

However, in the above image display apparatuses, there is a problem that, if image data corresponding to an image scanned at a high scanning resolution is displayed in a small size, a greater amount of image data than an amount of data sufficient for obtaining a visually required image resolution would have to be processed, thereby increasing the redundancy of the image data and lowering the processing efficiency. In addition, since a higher rate of the scanning resolution necessitates a longer period of time for scanning an image with the image sensor, when a multiplicity of images have to be processed, such as in the case of the index display, the period of time required for processing the image data becomes very long. Further, in order to process image data corresponding to an image scanned at the high scanning resolution, the storage capacity of a memory arranged to temporarily store the image data must be also increased, thereby disadvantageously causing an increase in production cost.

On the other hand, if image data corresponding to an image scanned at a low scanning resolution is displayed in a large size, the image resolution would become insufficient for visual sensations, thereby resulting in a poor quality of the image display.

Incidentally, in Japanese Laid-Open Patent Application No. HEI 6-326840, there is disclosed an art of varying a scanning resolution according to the enlarging rate of a print.

BRIEF SUMMARY OF THE INVENTION

In accordance with one aspect of this invention, there is provided an image display apparatus or an image printing apparatus in which, when scanning an image recorded on a film, a scanning resolution of the image is varied according to a size of display or a size of print of the image, so that a processing period of time for image data can be made short without requiring a large storage capacity.

The above and other aspects and objects of this invention will become apparent from the following detailed description of an embodiment thereof taken in connection with the accompanying drawings.

BRIEF DESCRIPTION OF THE SEVERAL VIEWS OF THE DRAWING

FIG. 1 is a block diagram showing the arrangement of an image display/printing apparatus according to a preferred embodiment of this invention.

FIG. 3 is a diagram for explaining the directions of scanning to be made by the line CCD.

FIG. 21 shows the contents of a data table stored in a ROM.

DETAILED DESCRIPTION OF THE INVENTION

Figure 2:
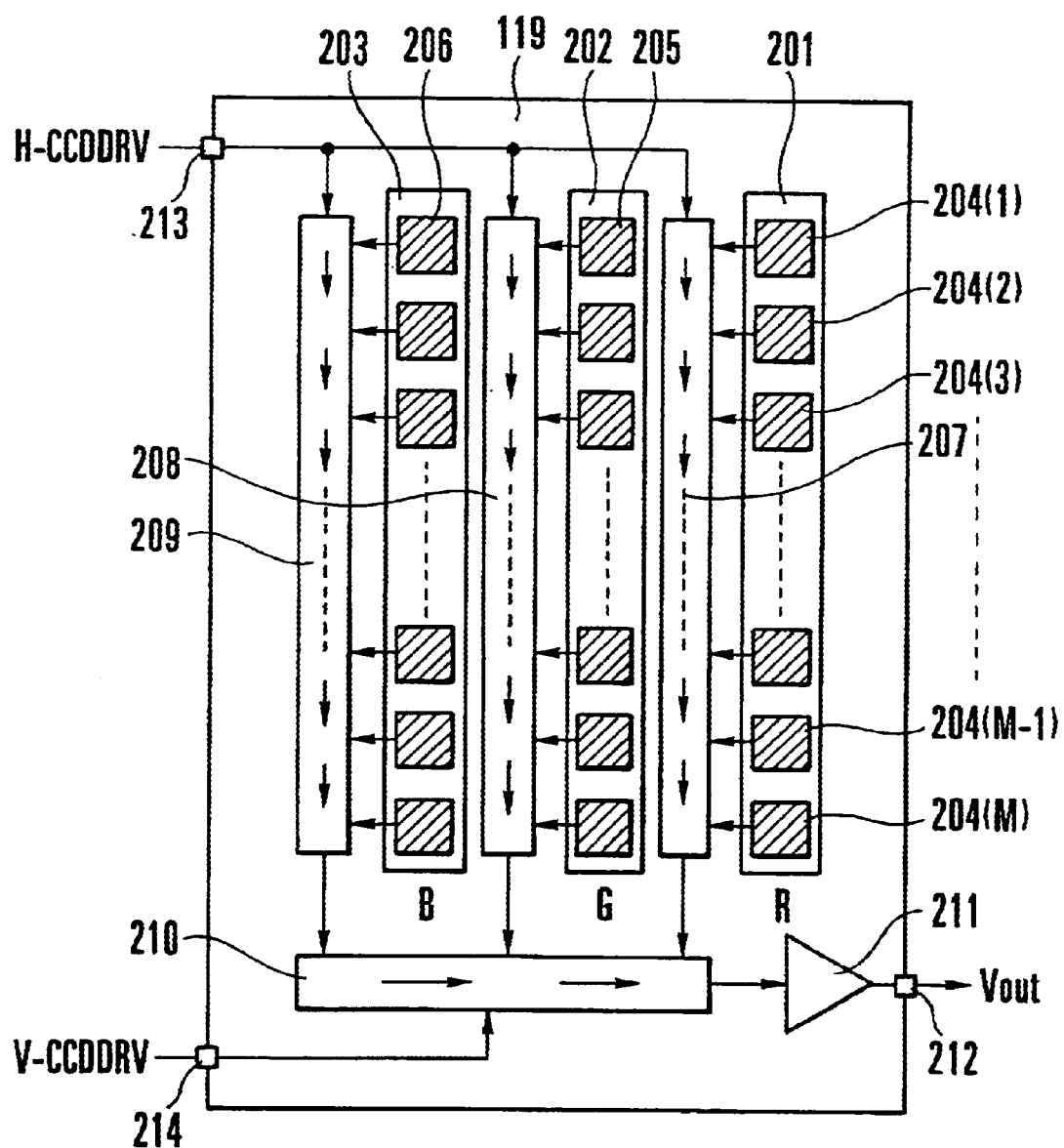
FIG. 2 shows the arrangement of a line CCD employed in the image display/printing apparatus.

FIG. 1 is a block diagram showing the entirety of an image display/printing apparatus arranged according to this invention as an embodiment thereof. Referring to FIG. 1, a sys em controller 101 is arranged to perform sequential control and computing operations. In a ROM 102, programs and predetermined data are stored. A RAM 103, which is arranged to store data, is provided with a storage area 103a for storing index image data of low resolution and a storage area 103b for storing image data of high definition.

The image display/printing apparatus further includes a keyboard 104, a detecting circuit 105 for detecting the operation of the keyboard 104, a printer 106 for printing images, a driving circuit 107 for driving the printer 106, a printing data buffer memory 108 for storing image data to be printed, and a CRT arranged as a display device for displaying printing conditions as well as images.

In FIG. 1, a part encompassed with a broken line shows the arrangement of a film scanner. In the film scanner, there are illustrated a film cartridge 110 containing therein a film 112 which has been exposed by photography and developed, a film winding shaft ill, the film 112, a spool shaft 113 for taking up the film 122 thereonto, a motor 114 arranged to drive the film winding shaft 111, and a motor 115 arranged to drive the spool shaft 113. A driver 116 is arranged to drive the motor 114 and the motor 115.

The image display/printing apparatus further includes an illumination light source 117 arranged to be used in picking up an image, a light source lighting circuit 118, a line CCD 119 arranged to pick up an image recorded on the film 112, a picked-up image signal processing circuit 120, and an A/D converter 121 arranged to A/D (analog-to-digital) convert the picked-up image into image data.

The image display/printing apparatus further includes a CCD driver 122 arranged to supply a CCD driving signal to the line CCD 119, a photo-taking lens 123 arranged to form on the line CCD 119 an image or an image pickup area 124 corresponding to one frame recorded on the film 112, an image pickup block 125 arranged to support the line CCD 119 and the photo-taking lens 123 in one unified body, a rack gear 126 integral with the image pickup block 125, a pinion gear 127, a stepping motor 128 arranged to rotate the pinion gear 127, and a stepping motor driver 129 arranged to drive the stepping motor 128.

The image pickup block 125 is arranged to be moved for scanning in the directions of arrows according to the linear movement of the rack gear 126 caused by the rotation of the pinion gear 127 which is coaxial with the stepping motor 128. An image recorded on the film 112 is thus scanned by the image pickup block 125. Here, the number of steps of the stepping motor 128 for sub-scanning (vertically scanning) the image pickup area 124 of the film 112 is assumed to be N.

FIG. 2 shows in detail the arrangement of the line CCD 119. Referring to FIG. 2, an R (red) filter 201 allows only the wavelength of red color to pass through. A G (green) filter 202 allows only the wavelength of green color to pass through. A B (blue) filter 203 allows only the wavelength of blue color to pass through. Photodiodes 204, 205 and 206 are arranged respectively beneath the R, G and B filters 201, 202 and 203. Each of the photodiodes 204 to 206 is composed of M pixels beneath the R, G and B filters 201, 202 and 203. In other words, the CCD 119 has three lines, i.e., R, G and B lines, each of which is composed of M pixels. In FIG. 2, the respective numerals in parentheses denote pixel numbers obtained by counting from one end of each of the R, G and B lines.

A horizontal electric charge transfer part 207 is arranged to serially transfer the amounts of electric charge which the photodiode 204 of the R line has accumulated by sensing incident light, in the direction of an arrow in accordance with a predetermined synchronizing clock signal. A horizontal electric charge transfer part 208 is arranged to serially transfer the amounts of electric charge which the photodiode 205 of the G line has accumulated by sensing incident light, in the direction of an arrow in accordance with the predetermined synchronizing clock signal. A horizontal electric charge transfer part 209 is arranged to serially transfer the amounts of electric charge which the photodiode 206 of the B line has accumulated by sensing incident light, in the direction of an arrow in accordance with the predetermined synchronizing clock signal.

A vertical electric charge transfer part 210 is arranged to serially transfer, one by one for each pixel, the amounts of electric charge of the three lines transferred by the horizontal electric charge transfer parts 207, 208 and 209, in accordance with a predetermined synchronizing clock signal.

A buffer amplifier 211 is arranged to convert into a voltage the amount of electric charge of each of pixels of each line outputted from the vertical electric charge transfer part 210. The buffer amplifier 211 is provided with an output terminal (Vout) 212. A synchronizing clock signal input terminal (H-CCDDRV) 213 is arranged to input a synchronizing clock signal to each of the horizontal electric charge transfer parts 207, 208 and 209. A synchronizing clock signal input terminal (V-CCDDRV) 214 is arranged to input a synchronizing clock signal to the vertical electric charge transfer part 210.

FIG. 3 is a diagram for explaining the scanning positions of the line CCD 119 obtained when an image of each frame recorded on the film is scanned by the line CCD 119.

As mentioned above with reference to FIG. 2, in the image scanning part of the embodiment, the CCD 119 which includes the R, G and B lines, each consisting of M pixels, is arranged to pick up an image by scanning the image only once, in a manner called "one-pass scanning". Here, the direction of each line of the line CCD 119 is assumed to be a main scanning (electric) direction, and the direction in which scanning is made by the stepping motor 128 is assumed to be a sub-scanning (mechanical) direction. Color separation is carried out by means of the color filters 201, 202 and 203 which are formed on the photodiodes 204, 205 and 206.

Incidentally, the photodiodes 204, 205 and 206 of three lines must be somewhat mechanically spaced from each other due to the forming process. Therefore, the image areas on the film surface to be picked up by one of the photodiodes for colors inevitably come to deviate from the image areas to be picked up by another photodiode to an extent obtained by multiplying the distance of spacing by the optical magnifying rate of the photo-taking lens 123. In the case of this embodiment, however, the spacing distance between the photodiodes is assumed to be short enough to be inconsequential with respect to the pixel size of each photodiode. The image pickup areas for one color are thus assumed to be equal to the image pickup areas for another color, in the following description.

The horizontal direction of the CCD 119 is assumed to be the transverse direction in FIG. 3, and the vertical direction of the CCD 119 is assumed to be the longitudinal direction in FIG. 3. The image scanning part of the embodiment is arranged, as mentioned with reference to FIG. 1 in the foregoing, to have the image pickup block 125 moved stepwise by the sub-scanning stepping motor 128 in the vertical direction as viewed in FIG. 3.

In FIG. 3, reference numeral 301 denotes an image recording area on the film. While the recording area 301 is illustrated, in FIG. 3, in such a manner as to be broader than the scanning area of the CCD 119, for the sake of explanation, the scanning area of the CCD 119 may be arranged to be broader than the image recording area 301 on the film.

Further, in FIG. 3, each of the image pickup areas to be picked up simultaneously by the pixels in the vertical direction of the photodiodes 204 to 206 or R, G and B lines of the CCD 119 is indicated as Pixel(m,n). Reference symbol "m" denotes an ordinal number of the pixel in the horizontal direction, and reference symbol "n" denotes an ordinal number of the pixel in the vertical direction. Since the number of steps in the sub-scanning direction is N, the total number of pixels obtained by scanning can be expressed as "M×N" from Pixel(1,1) to Pixel(M,N).

Figure 4:
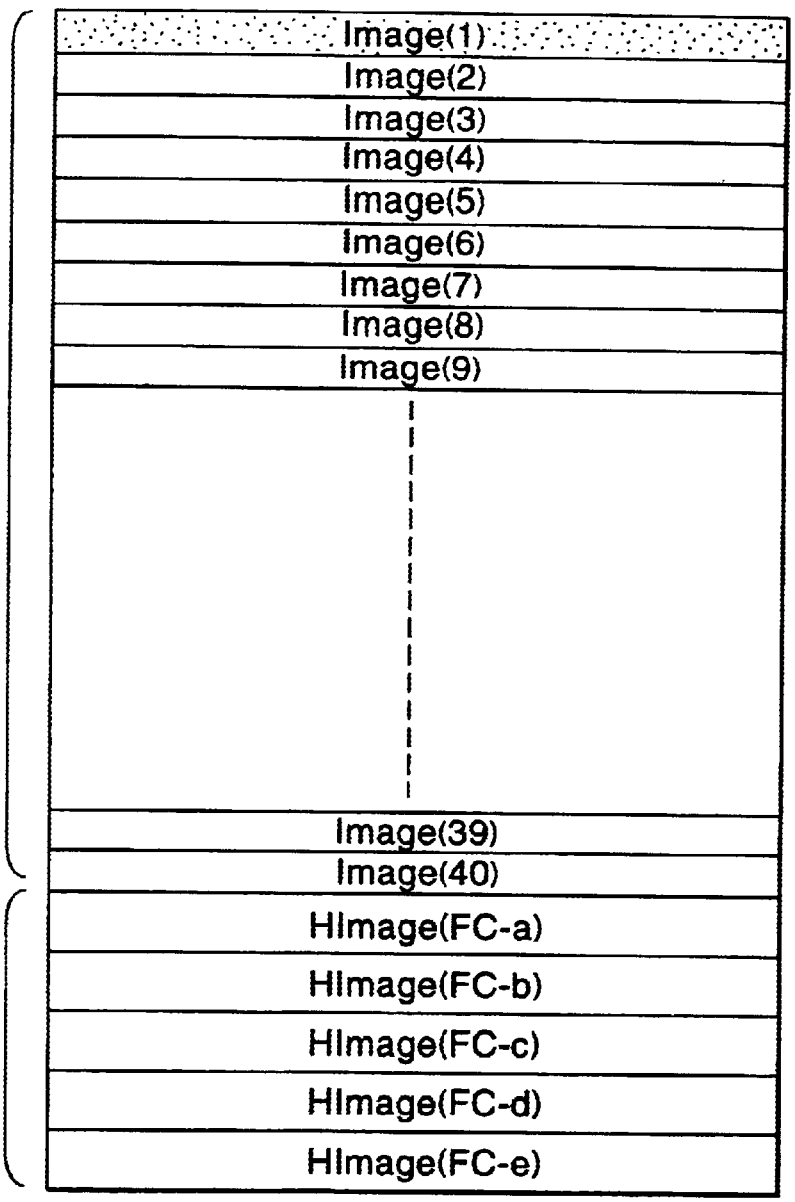
FIG. 4 is a diagram for explaining storage areas arranged within a RAM used in the image display/printing apparatus.

FIG. 4 shows a memory arrangement of the RAM 103. As shown, the RAM 103 includes a storage area 103a which is arranged to store image data of low resolution for each frame and a storage area 103b which is arranged to store image data of high definition. In the low-resolution image data storage area 103a for each frame, image data Image(1) to Image(40) for the respective frames are stored one after another in the order of predetermined addresses, each within a predetermined capacity.

In the high-definition image data storage area 103b, image data of high definition HImage(FC) are stored for a predetermined number of frames together with data which indicates numbers assigned to the frames.

The data storage capacity of the RAM 103 which is thus arranged to store image data is described as follows. As mentioned above with reference to FIG. 3, in the case of this embodiment, the total number of pixels to be scanned per frame of the film is "M×N". Assuming that 8 bits are used per pixel in expressing gradation for each of colors R, G and B, the image data storage capacity required for one frame becomes "3×(M×N)" bytes.

The arrangement described above shows a case where an image is scanned at a rate of one scanning step per pixel both in the main scanning direction and sub-scanning direction. In this case, the image is picked up at the highest rate of definition (resolution) possible in the embodiment.

On the other hand, in cases where an index image is to be taken in for the purpose of roughly finding the images of all frames recorded on a film, or where the images are to be printed in a small size, the image data of a lower rate of resolution suffices, so that skip scanning is performed. In such a case, the low-resolution image data storage area 103a is used as an area where an index image is stored for each of frames.

For the index image, scanning is performed every third pixel. Therefore, in the case of the index image, the amount of image data for each frame becomes "(M/3)×(N/3)×3" bytes.

A total amount of image data that can be stored in the embodiment is image data for 40 frames. The storage areas for these frames are expressed as Image(1) to Image(40).

In the high-definition image data storage area 103b, on the other hand, image data of high definition is stored. As mentioned above, the amount of image data is "(M×N)×3" bytes with scanning made for every pixel. The amount of image data becomes "(M/2)×(N/2)×3" bytes if scanning is made every second pixel. The storage area 103b does not have an enough area for high-definition image data of all frames and is arranged to store as necessary only the image data required for printing.

Figure 5:
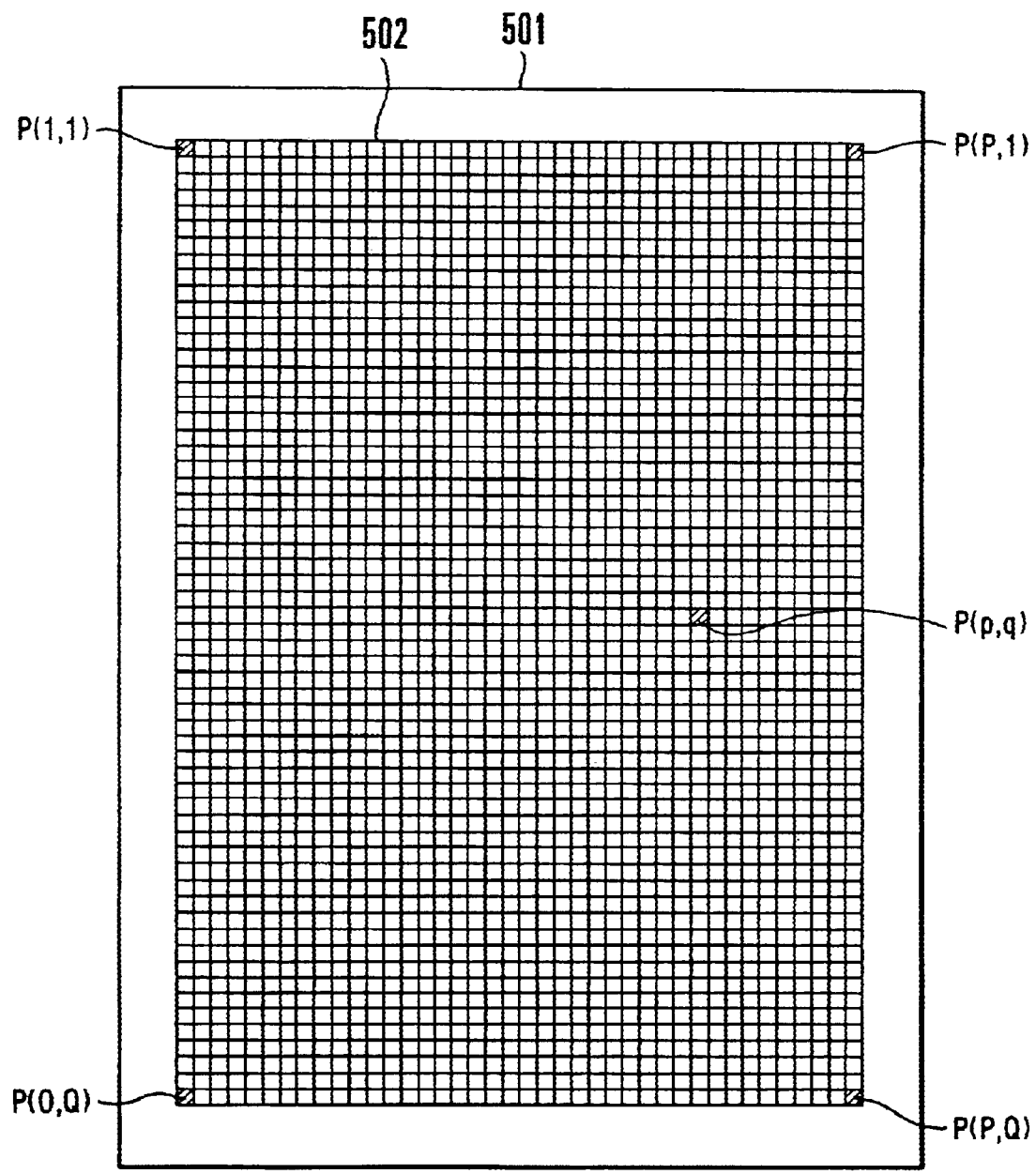
FIG. 5 is a diagram for explaining addresses of a printing data buffer memory used in the image display/printing apparatus and display/printing areas on a display or printing paper.

FIG. 5 is a diagram for explaining the correspondence of image data addresses of the printing data buffer memory 108 to a printing paper.

In FIG. 5, reference numeral 501 denotes the whole area of the printing paper. Reference numeral 502 denotes an image data printing area. The printer 106 has a total of "P×Q" printing pixels, which are composed of P pixels in the horizontal direction and Q pixels in the vertical direction. The address of an arbitrarily selected pixel is assumed to be expressed as P(p,q).

The printing data buffer memory 108 is arranged to have its addresses correlated in a ratio of 1:1 to physical positions of actual printing. In other words, data stored at an address P(1,1) of the printing data buffer memory 108, for example, will be printed in the uppermost left end position within the image data printing area 502 of the whole area 501 of the printing paper.

If the printer 106 is arranged to be capable of full-color printing for the total of 24 bits including 8 bits for each of C, M and Y, the storage capacity of the printing data buffer memory 108 becomes "(P×Q)×3" bytes.

Figure 6:
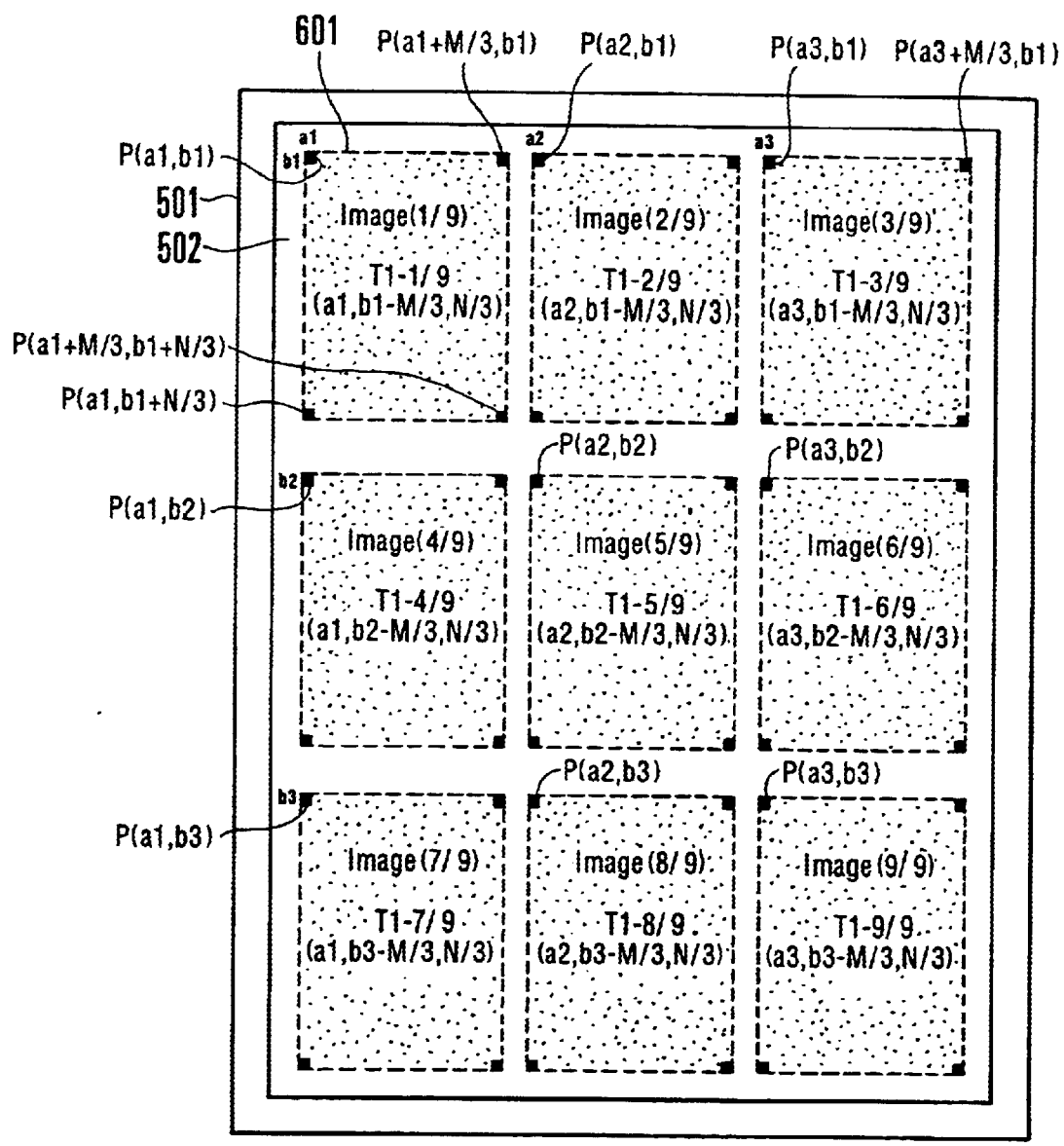
FIG. 6 is a diagram for explaining the above-stated addresses and the display/printing areas in the case of a template 1.
Figure 7:
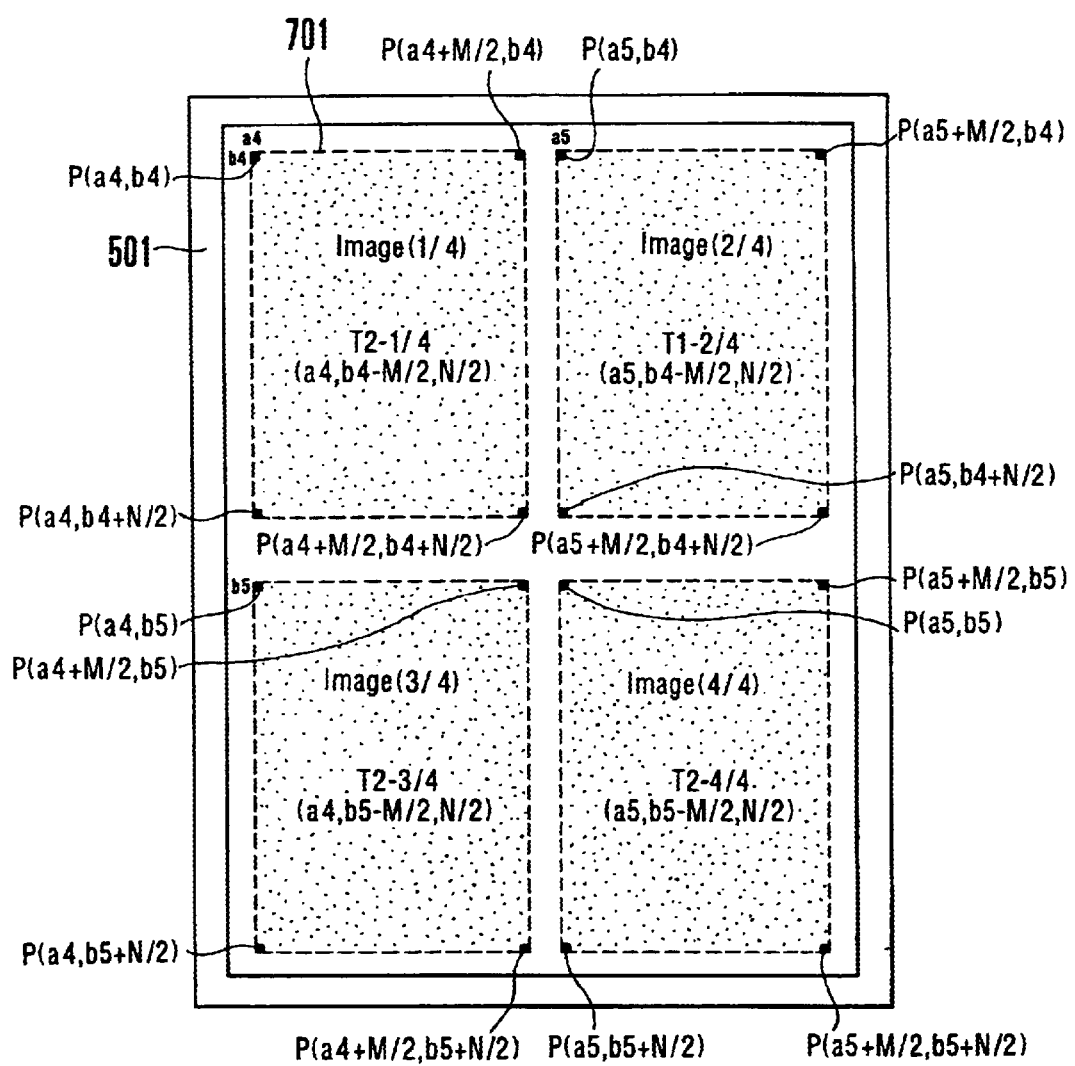
FIG. 7 shows the above-stated addresses and the display/printing areas in the case of a template 2.
Figure 8:
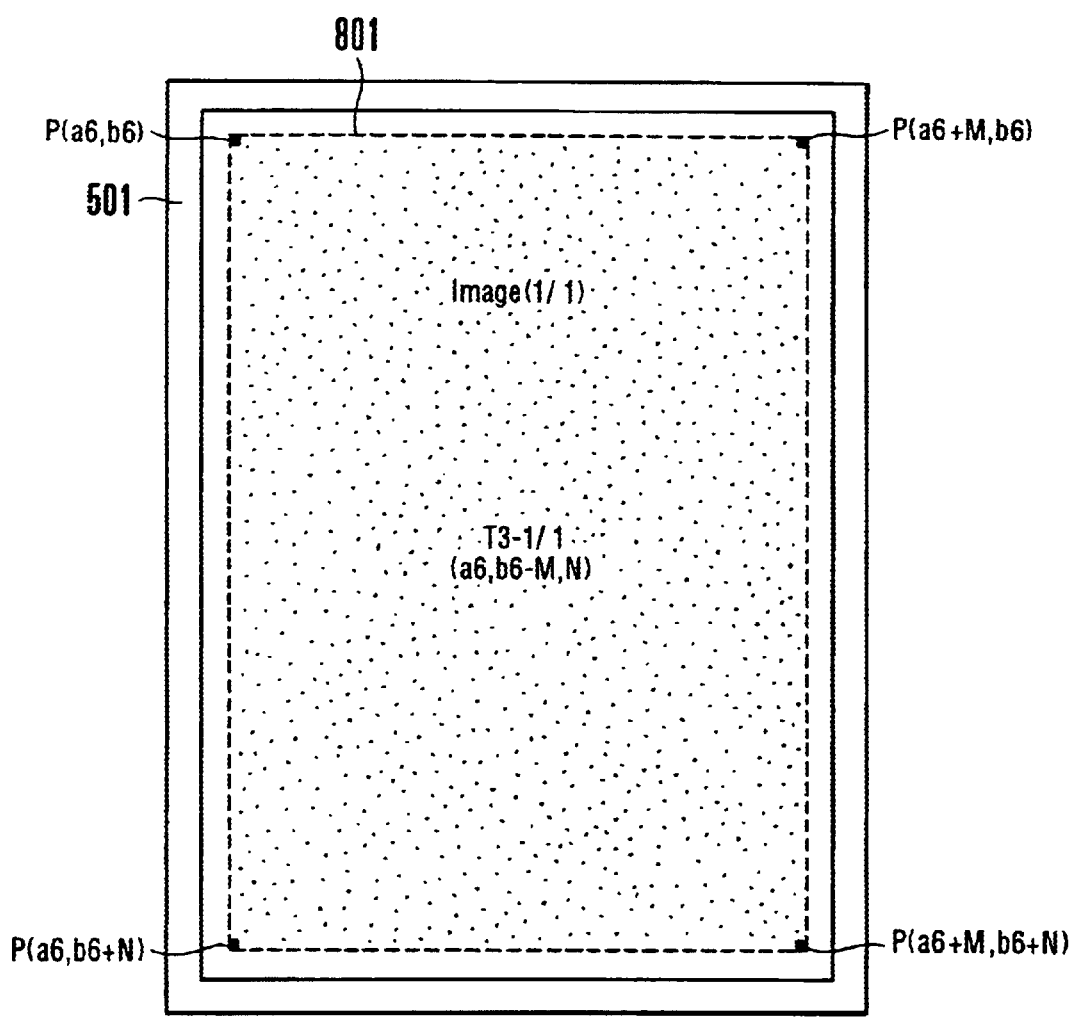
FIG. 8 shows the above-stated addresses and the display/printing areas in the case of a template 3.

FIGS. 6, 7 and 8 are diagrams for explaining the relationship between the printing position on the printing paper and print template data to be printed. In this embodiment, three different templates 1, 2 and 3 are stored.

Referring to FIG. 6, the arrangement of the template 1 is described in outline as follows. A total of nine images, i.e., three in the vertical direction and three in the transverse direction, are arranged by the template 1. The data of the template 1 is described below using the image data Image (1/9) located in the upper left position as a representative of the nine images.

Reference numeral 601 denotes a position where the first image data included in the template 1 is located. The exact arrangement position and size of each image data can be designated by information on the address in the printing data buffer memory 108 of a left upper pixel of each image data and on image sizes in the horizontal and vertical directions of each image data.

In the case of the image data Image(1/9), for example, its arrangement position and image size are as follows. With the coordinates of the left upper corner in the image data Image(1/9) assumed to be expressed by the coordinates within the printing data buffer memory 108, the arrangement position is P(a1, b1). The image size is M/3 in the horizontal direction and N/3 in the vertical direction.

Then, the coordinates on the printing data buffer memory 108 of other three corner points of the image data Image(1/9) can be expressed respectively as P(a1 +M/3, b1), P(a1, b1 +N/3), P(a1 +M/3, b1 +N/3). The arrangement positions of other eight image data are as shown in FIG. 6.

FIG. 7 similarly shows the arrangement of the template 2. The template 2 includes a total of four image data. The size of each image data can be expressed as "horizontal direction×vertical direction=(M/2)×(N/2)". Reference numeral 701 denotes the arrangement position of the first image data included in the template 2. The exact arrangement position and the image size of each image data are as shown in FIG. 7.

FIG. 8 shows the arrangement of the template 3. The template 3 includes only one image data. Reference numeral 801 denotes the arrangement position of the single image data in the template 3. The arrangement position and the image size of the image data are as shown in FIG. 8.

Information on the templates including the number of frames of image data and the arrangement position and image size of each image data corresponding to each of the templates 1, 2 and 3 is stored in the form of a data table within the ROM 102, as shown in FIG. 21.

In FIG. 21, data about the arrangement position and image size are expressed in the following manner.

"template number"–{"ordinal number of image data within the template"/"total number of image data included in the template"} ("coordinates of left upper corner"–"image size in horizontal direction", "image size in vertical direction")

The operations of the image display/printing apparatus which is arranged according to this invention as described above are next described with reference to FIGS. 9 to 20.

Figure 9:
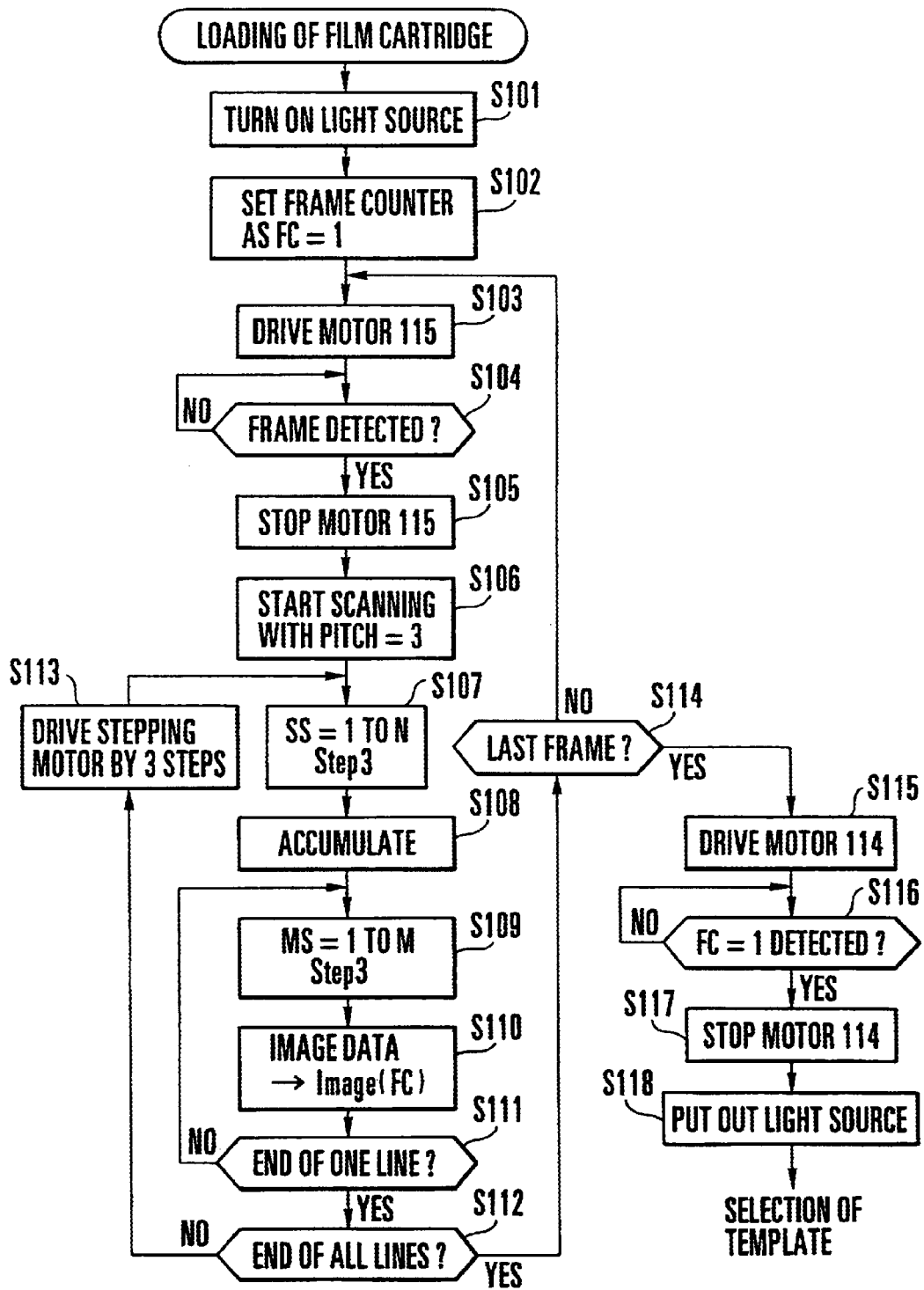
FIG. 9 is a flow chart showing a flow of actions of the image display/printing apparatus.

FIG. 9 is a flow chart showing processes for scanning an image recorded on the film. Referring to FIG. 9, with a power supply which is not shown turned on, when the film scanner is loaded with the film cartridge 110, the system controller 101 begins to operate.

At a step S101, the illumination light source 117 for picking up images is turned on.

At a step S102, a frame counter (FC) is set to "1".

At a step S103, the motor driver 116 is caused to drive the film winding motor 115 to rotate the take-up spool shaft 113. The processes for loading the film cartridge 110 and for pulling out the film 112 from the cartridge 110 to wind it on the spool shaft 113 are omitted from description.

At a step S104, a check is made to find if an image frame is located in the image pickup area 124 at the line CCD 119. If so, the flow proceeds to a step S105. The frame can be detected by any of various methods including, for example, a method of detecting by means of the line CCD 119 a space between the image data recorded on the film, a method of mechanically or electrically detecting perforations provided for film transportation, and, in a case where frame information is formed beforehand in the form of a latent image such as a bar code outside of an image area on the film, a method of detecting it by means of a photoelectric element.

At a step S105, the rotation of the film winding motor 115 is brought to a stop.

At a step S106, the line CCD 119 is caused to begin picking up the image for one frame recorded on the film 112. In picking up the image, both the main scanning and the sub-scanning are carried out at the scanning pitch of "3" (every third pixel), that is, scanning is performed at a low resolution.

At a step S107, sub-scanning steps from "1" to "N" by the stepping motor 128 is decided to be made at the pitch of three steps.

At a step S108, an amount of image data corresponding to one line of the sub-scanning step (SS) is accumulated. After completion of the process of accumulation, the flow proceeds to a step S109.

At the step S109, electric charges accumulated by the photodiodes 204(1 to M), 205(1 to M) and 206(1 to M) are decided to be transferred by the horizontal electric charge transfer parts 207, 208 and 209. Then, the electric charges accumulated for pixels from "1" to "M" are transferred in the main scanning direction at the pitch of three steps.

At the CCD 119, the electric charges serially transferred from the horizontal electric charge transfer parts 207, 208 and 209 in the horizontal direction, as shown in FIG. 2, are converted by the vertical electric charge transfer part (vertical CCD) 210 into voltages through the buffer amplifier 211, at the pitch of three steps, and are supplied to the picked-up image signal processing circuit 120 through the output terminal (Vout) 212. The output of the picked-up image signal processing circuit 120 is supplied to the A/D converter 121 to be analog-to-digital converted into image data.

At a step S110, the image data obtained by the A/D converter 121 is taken into the system controller 101. The image data is then transferred to an applicable area of the RAM 103. The image data is thus stored in an image data storage area corresponding to the frame number of the image data, i.e., at an address Image(FC). The RAM 103 has image data storage areas arranged therein as described in the foregoing.

At a step S111, a check is made to find if the accumulation of electric charges for one main scanning line and the storing of the image data have been completed. If so, the flow of operation proceeds to a step S112. If not, the flow returns to the step S109 to execute again the processes of the step S109, i.e., to drive the horizontal electric charge transfer parts 207, 208 and 209 for three pixels, to vertically transfer the data of each pixel, to analog-to-digital convert the image data and to store the image data in the RAM 103.

At the step S112, a check is made to find if the sub-scanning steps from a step "1" to a step "N" at the pitch of three steps have been completed. If so, the flow proceeds to a step S114. If not, the flow proceeds to a step S113.

At the step S113, the stepping motor 128 for the sub-scanning is driven by three steps, and scanning shifts to the main scanning for a next line.

At the step S114, a check is made to find if scanning of all the lines of the last frame have been completed. If not, the flow returns to the step S103 to perform scanning for a next frame. If so, the flow proceeds to a step S115.

At the step S115, a rewinding action for the film 112 begins by driving the film winding shaft 111 with the motor 114.

At a step S116, the film counter (FC) is checked to find if the film has been rewound up to the first frame. If so, the flow proceeds to a step S117. If not, the flow continues to carry on the film rewinding action.

At the step S117, the rotation of the motor 114 is brought to a stop.

At a step S118, the illumination light source 117 is turned off.

Figure 10:
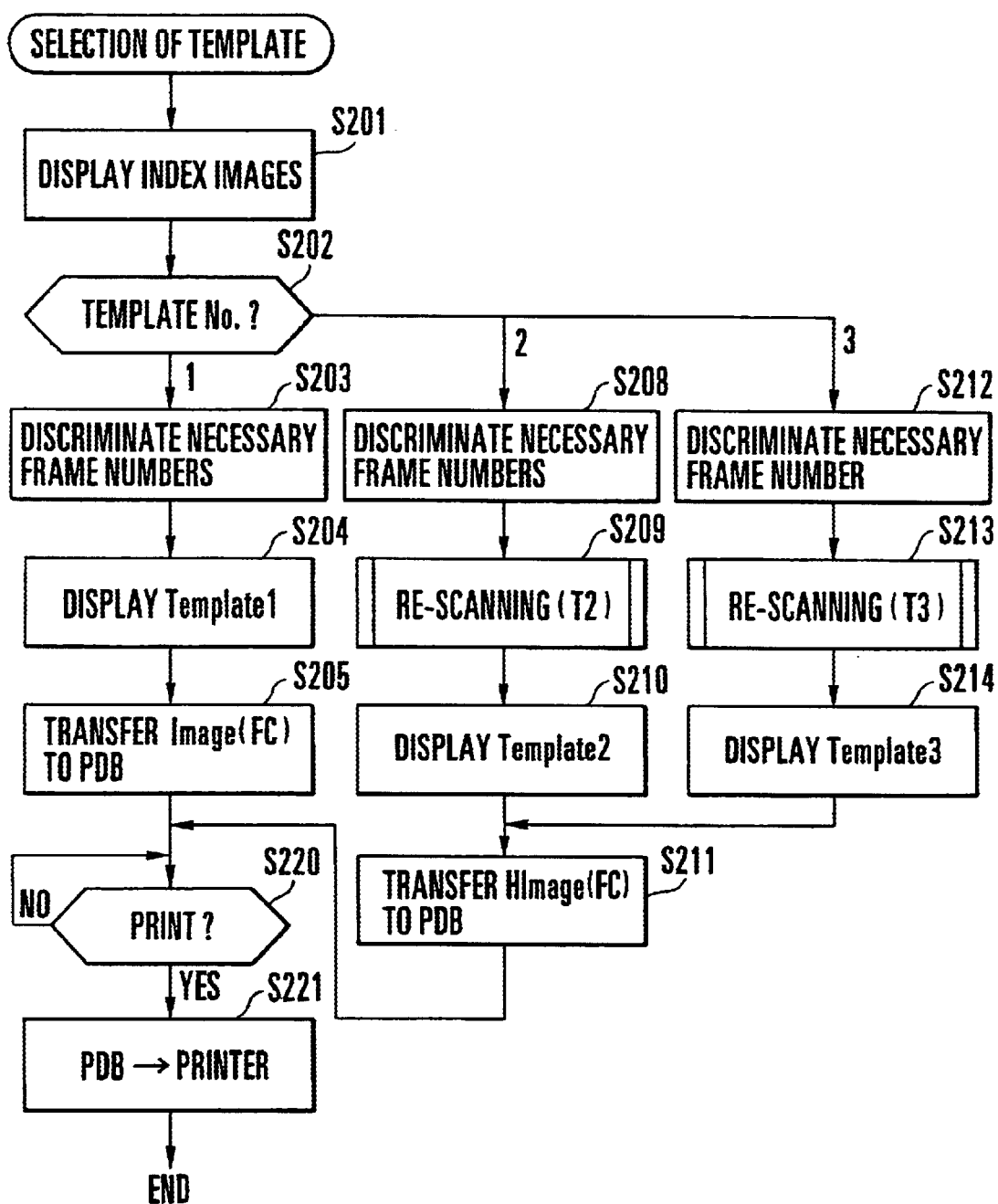
FIG. 10 is a flow chart showing another flow of actions of the image display/printing apparatus.
Figure 11:
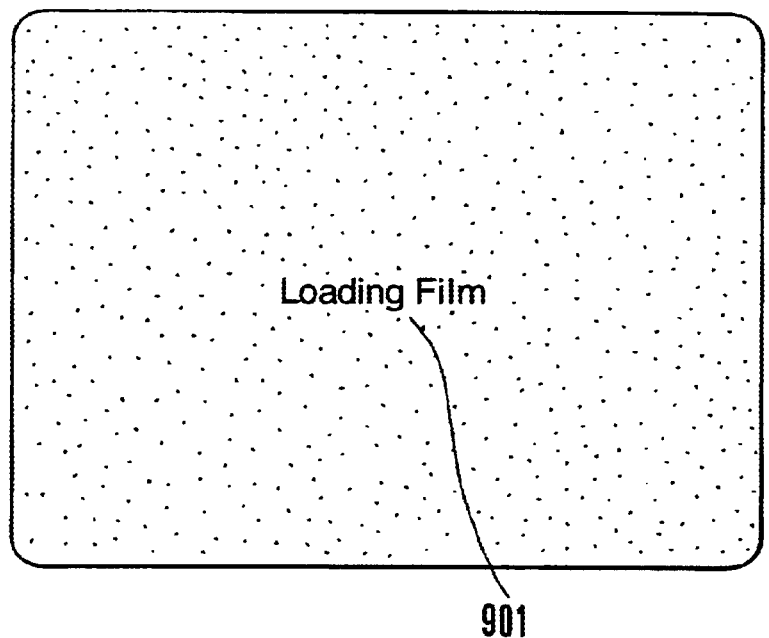
FIG. 11 shows by way of example a display made on a CRT used in the image display/printing apparatus.

After the step S118, the flow of operation shifts to a flow of processes shown in FIG. 10 for selecting a printing template. FIGS. 11, 12, 13, 15 and 17 show the details of displays made on the CRT 109 while the apparatus is in operation. Among these figures, FIG. 11 shows a state in which an indication 901 that the apparatus is in process of scanning an image is provided.

Figure 12:
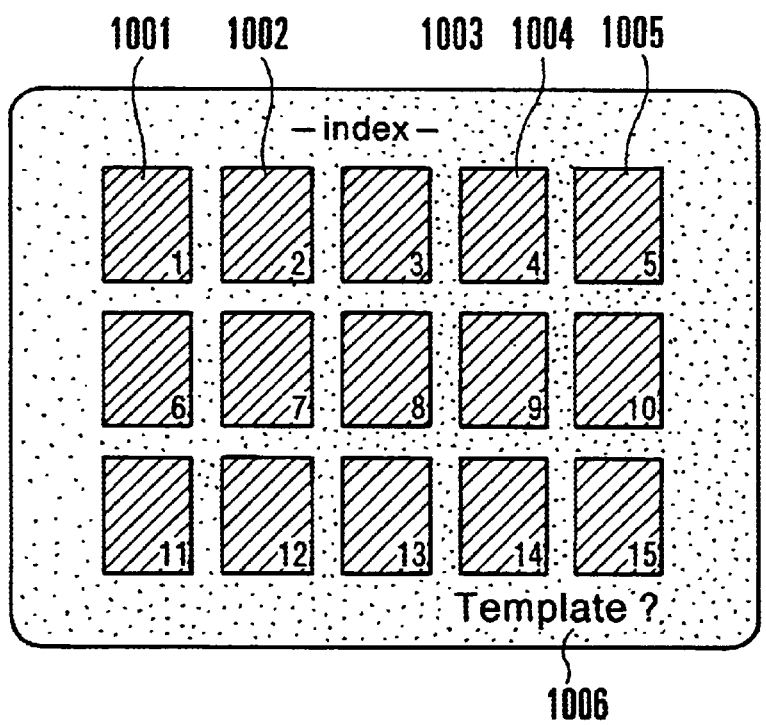
FIG. 12 shows an index display made on the CRT.

Referring to FIG. 10, at a step S201, an index image display is made on the CRT 109, as shown in FIG. 12, by serially reading out the low-resolution image data of necessary frames scanned at the scanning pitch "3" (every third step). At the same time, an indication is provided to urge the operator to select and input a printing template number as desired. The template number is inputted from the keyboard 104. In FIG. 12, reference numeral 1001 denotes image data counted as "1" by the frame counter FC. Other image data subsequently counted by the frame counter FC as "2", "3" and so on are indicated respectively by reference numbers 1002, 1003, - - - . Reference numeral 1006 denotes the indication urging the operator to input the desired template number.

At a step S202, a check is made for the inputted template number. If the template number is "1", the flow proceeds to a step S203. If the template number is "2", the flow proceeds to a step S208. If the template number is "3", the flow proceeds to a step S212.

At the step S203, with the template number "1" selected, a reference is made to the data table shown in FIG. 21 to read out from the ROM 102 the number of frames of image data set by the template 1. Then, necessary frame numbers are discriminated from others.

At a step S204, the template 1 is caused to be displayed on the CRT 109. Since a total of nine image data frames are included in the template 1, the necessary frame numbers of image data are from "1" to "9".

Figure 13:
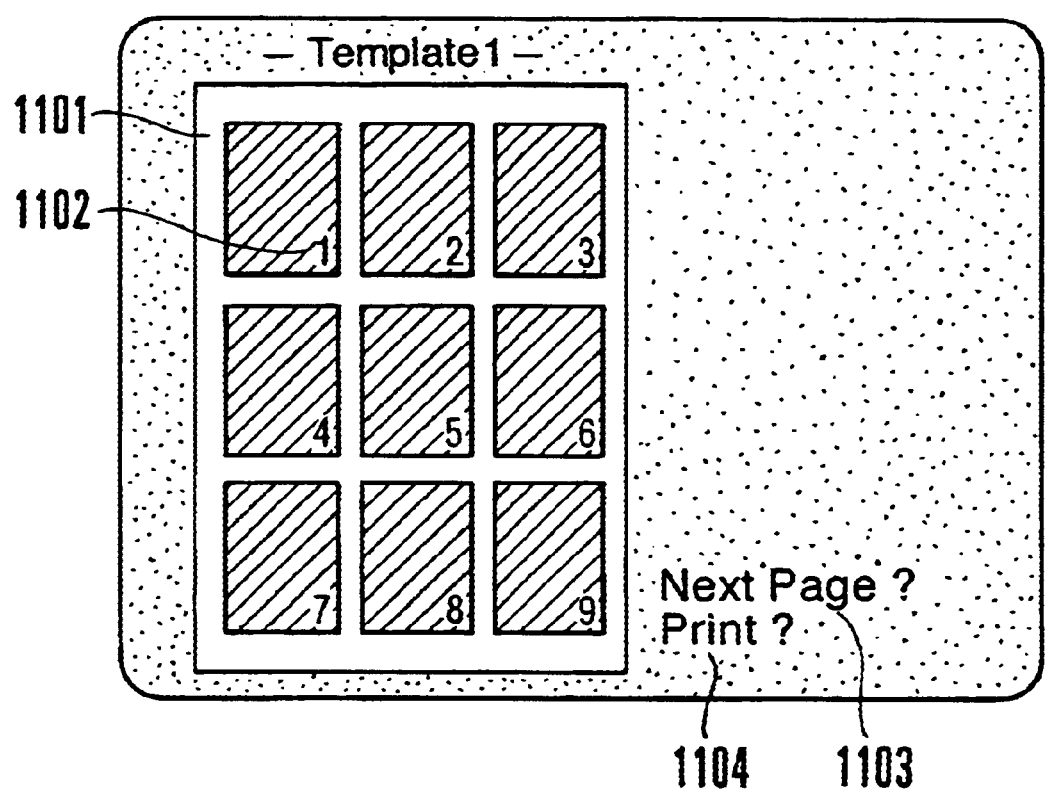
FIG. 13 shows a display made on the CRT according to the template 1.

The image data Image(1) to Image(9) stored in the low-resolution image data storage area 103a within the RAM 103 are then caused to be displayed according to the image data arrangement positions of the template 1, as shown in FIG. 13. At the same time, indications are provided to urge a next page display process and a printing process. In FIG. 13, reference numeral 1101 denotes the template 1 on display. Reference numeral 1102 denotes each frame number. Reference numerals 1103 and 1104 respectively denote the indications urging the next page display process and the printing process. These processes are selectable by means of the keyboard 104.

While the template 1 is arranged to include nine frames of image data within a single sheet, the film contained in one film cartridge is arranged to permit a greater number of frames to be recorded thereon. In the case of this embodiment, the RAM 103 permits up to 40 image data frames to be stored within the low-resolution image data storage area 103a. Therefore, in order to display other frame numbers including a next frame number "10" and subsequent frame numbers, it is necessary to increase the number of display pages. However, the next page process is omitted from description herein.

Further, in displaying image data of each frame on the CRT 109, it is necessary to have template data corresponding to the resolution of the CRT 109 arranged in a video RAM within a video circuit provided for the CRT display, to determine an image data arrangement position accordingly and to write the image data of an applicable frame. However, the details of such arrangement are also omitted from the description given herein.

At a step S205, frame image data Image(FC) is written into the printing data buffer memory 108 on the basis of template information on the image data arrangement position and the image size. For example, if the image data is for the frame number "1" as shown in FIG. 6, an address within the printing data buffer memory 108 which corresponds to the left upper position in the template 1 becomes a rectangular shape 601 defined by a diagonal between the coordinates (a1, b1) and the coordinates (a1 +M/3, b1 +N/3). Further, since both the main scanning and the sub-scanning are to be carried out at the scanning pitch "3", the image size becomes "M/3 ×N/3". In such a manner, the image data for nine frames Image(1) to Image(9) defined by the template 1 are transferred to the printing data buffer memory 108.

At the step S208, with the template 2 selected, a reference is made to the data table shown in FIG. 21. The number of frames of image data set by the template 2 is read out from the ROM 102, and necessary frame numbers are discriminated. Since the number of image data frames is four according to the template 2, the frame numbers are "1" to "4".

Figure 14:
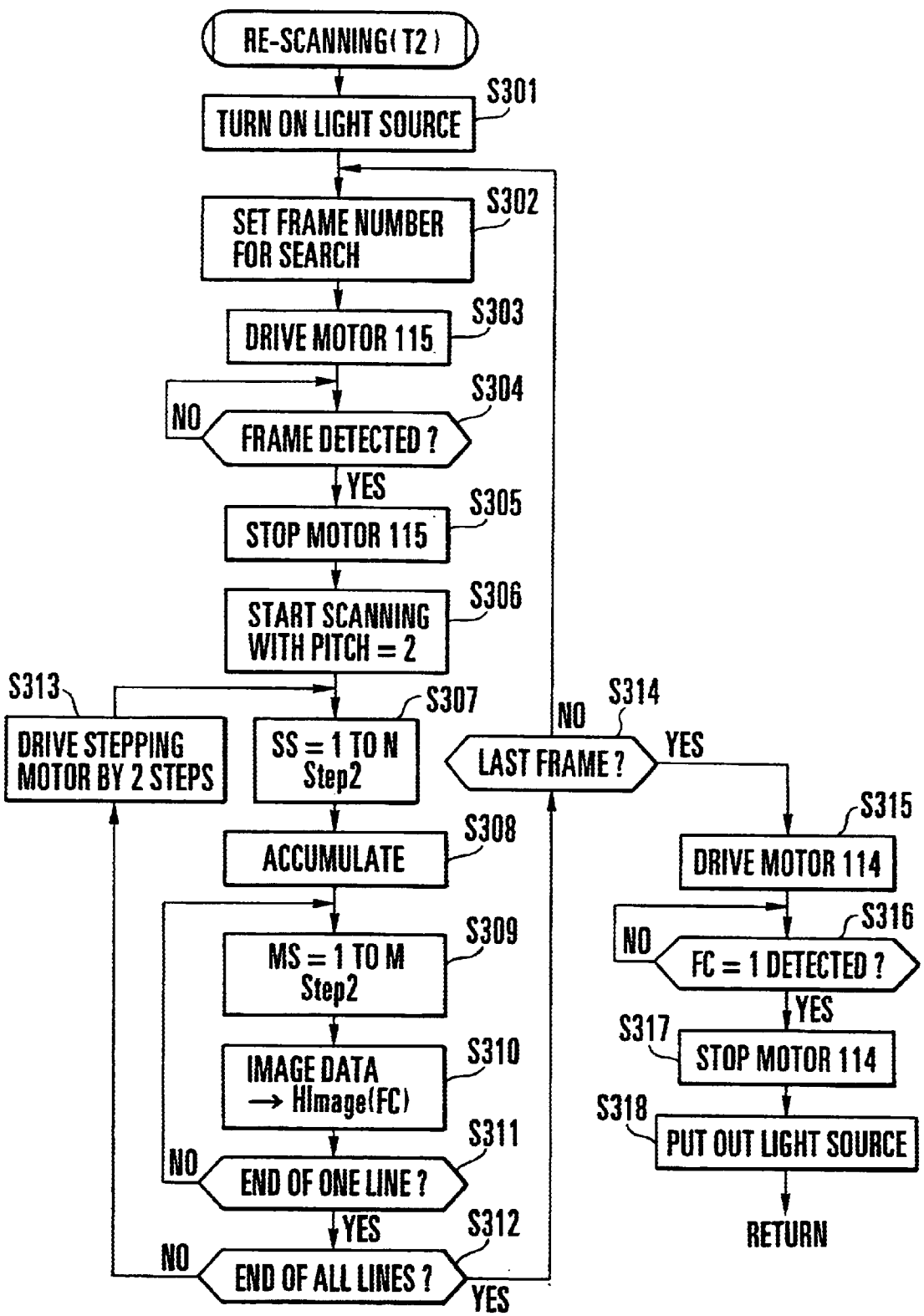
FIG. 14 is a flow chart showing a flow of actions performed by the image display/printing apparatus.

At a step 209, a subroutine of re-scanning (T2) is carried out according to a flow of operation which is shown in FIG. 14.

Referring to FIG. 14, at a step S301, the illumination light source 117 is turned on.

At a step S302, a frame number to be re-scanned is determined, and a search for the frame begins.

At a step S303, the motor 115 is driven to wind the film 112 for the search of the frame.

At a step S304, a check is made to find if the frame being searched has been found. If so, the flow proceeds to a step S305. If not, the flow continues to carry on the search.

At the step S305, the rotation of the motor 115 is brought to a stop to terminate winding the film 112.

At a step S306, the line CCD 113 is caused to begin to pick up one frame amount of image recorded on the film 112. In picking up the image, both the main scanning and the sub-scanning are performed at a scanning pitch "2" (every second step), i.e., at a high rate of scanning resolution.

At a step S307, the sub-scanning by means of the stepping motor 128 is decided to be made at the pitch of two steps from the step "1" to the step "N".

At a step S308, an amount of image data corresponding to one line of sub-scanning step (SS) is accumulated.

At a step S309, after completion of accumulation, the amounts of electric charges accumulated by the photodiodes 204(1 to M), 205(1 to M) and 206(1 to M) are decided to be transferred by the horizontal electric charge transfer parts 207, 208 and 209. The transfer in the direction of the main scanning is carried out at the pitch of two steps from "1" to "M".

At the line CCD 119, the electric charges serially transferred from the horizontal electric charge transfer parts 207, 208 and 209 in the horizontal direction are converted by the vertical electric charge transfer part 210 (vertical CCD) into voltages through the buffer amplifier 211, at the pitch of two steps, and are supplied to the picked-up image signal processing circuit 120 through the output terminal (Vout) 212. The output of the picked-up image signal processing circuit 120 is supplied to the A/D converter 121 to be A/D converted into image data.

At a step S310, the image data obtained through the A/D converter 121 is taken into the system controller 101. The image data is then transferred to the high-definition image data storage area 103b of the RAM 103. The image data is thus stored at an address HImage(FC). The high-definition image data storage area 103b within the RAM 103 is arranged as described in the foregoing.

At a step S311, a check is made to find if the accumulation of electric charges for one main scanning line and the storing of the image data have been completed. If so, the flow of operation proceeds to a step S312. If not, the flow returns to the step S309 to execute again the processes of the step S309, i.e., to drive the horizontal electric charge transfer parts 207, 208 and 209 for two pixels, to vertically transfer the data of each pixel, to A/D convert the image data and to store the image data in the RAM 103.

At the step S312, a check is made to find if the sub-scanning steps from the step "1" to the step "N" at the pitch of two steps have been completed. If so, the flow proceeds to a step S314. If not, the flow proceeds to a step S313.

At the step S313, the stepping motor 128 for the sub-scanning is driven by two steps, and scanning shifts to the main scanning for a next line.

At the step S314, a check is made to find if scanning of all the lines for the necessary frames have been completed. If not, the flow returns to the step S302 to make a search for a next frame. If so, the flow proceeds to a step S315.

At the step S115, a rewinding action for the film 112 begins by driving the film winding shaft 111 with the motor 114.

At a step S316, the film counter (FC) is checked to find if the film has been rewound up to the first frame. If so, the flow proceeds to a step S317 to bring the driving action of the motor 114 to a stop. This process is carried on until the film is rewound back to its first frame.

At a step S318, the illumination light source 117 is turned off, and the flow returns to the main routine.

Figure 15:
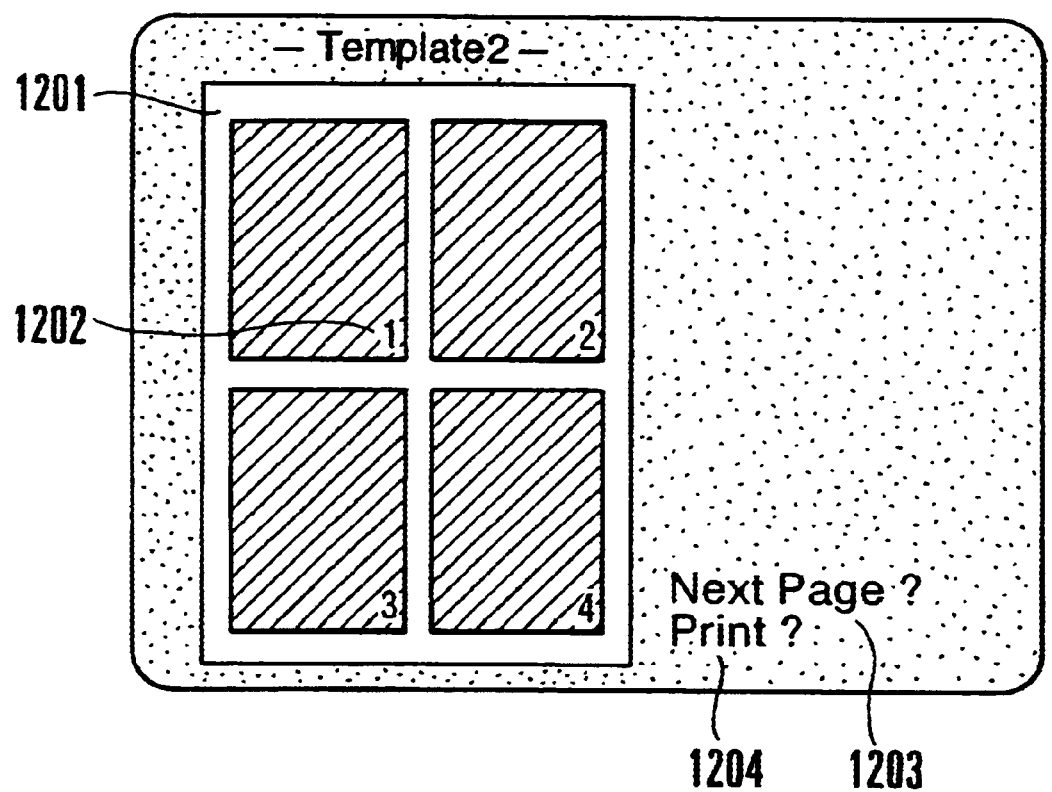
FIG. 15 shows a display made on the CRT according to the template 2.

Again referring to the flow chart of FIG. 10, at a step S210, the template 2 is displayed on the CRT 109. Then, by making a reference to the template data table in the ROM 102, four frames of the high-definition image data obtained by the above-stated re-scanning subroutine of the step S209 are pasted on the template 2 in predetermined areas as shown in FIG. 15 and are displayed on the CRT 109. In FIG. 15, reference numeral 1201 denotes the template 2 on display. Reference numeral 1202 denotes the frame number of each frame. Reference numerals 1203 and 1204 respectively denote indications urging a next page display process and a printing process.

At a step S211, the high-definition image data HImage (FC) of four frames obtained by the re-scanning subroutine (the step S209) are written into the printing data buffer memory 108 at predetermined addresses thereof by making a reference to the template data table.

For example, if the image data is for the frame number "1" as shown in FIG. 7, an address within the printing data buffer memory 108 which corresponds to the left upper position in the template 2 becomes a rectangular shape 701 defined by a diagonal between the coordinates (a4, b4) and the coordinates (a4 +M/2, b4 +N/2). Further, since both the main scanning and the sub-scanning are to be carried out at the scanning pitch "2", the image size becomes "M/2 ×N/2 ". In such a manner, the image data for four frames HImage(1) to HImage(4) set by the template 2 are transferred to the printing data buffer memory 108.

At a step S212, with the template 3 selected, a reference is made to the data table shown in FIG. 21. The number of frames of image data defined by the template 3 is read out from the ROM 102, and a necessary frame number is discriminated. Since the number of image data frames is one for the template 3, the frame number is "1".

At a step 213, a subroutine of re-scanning (T3) is carried out as described below according to a flow of operation shown in FIG. 16.

Figure 16:
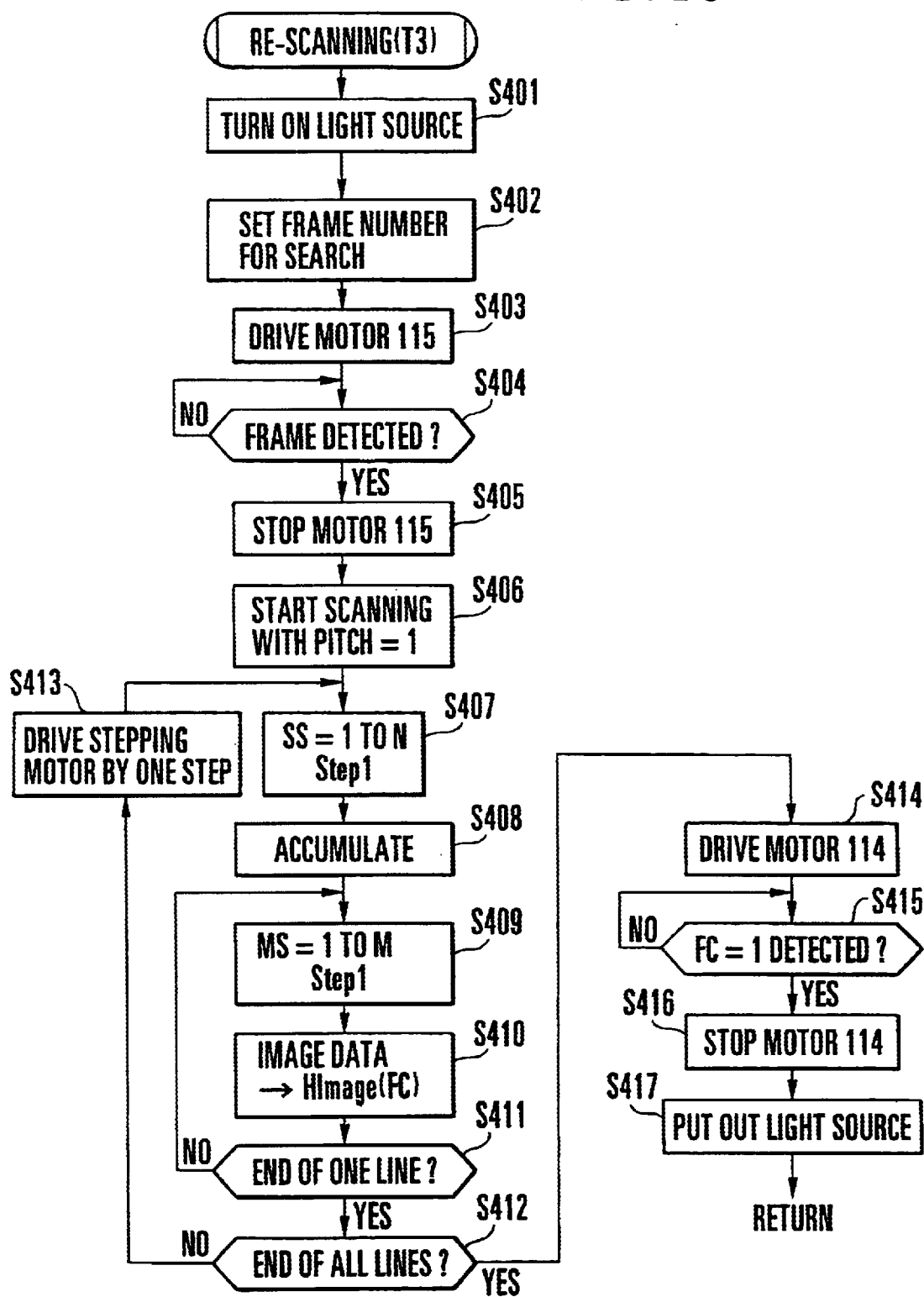
FIG. 16 is a flow chart showing another flow of actions performed by the image display/printing apparatus.

Referring to FIG. 16, at a step S401, the illumination light source is turned on.

At a step S402, a frame number to be re-scanned is determined and a search for the frame begins. Since image data of only one frame is to be included in one page in the case of the template 3, re-scanning is performed for one frame in this case.

At a step S403, the motor 115 is driven to wind the film 112 for the search of the frame.

At a step S404, a check is made to find if the frame being searched has been found. If so, the flow proceeds to a step S405. If not, the flow continues to carry on the search.

At the step S405, the rotation of the motor 115 is brought to a stop to terminate winding the film 112.

At a step S406, the line CCD 119 is caused to begin to pick up one frame amount of image recorded on the film 112. In picking up the image, both the main scanning and the sub-scanning are performed at a scanning pitch "1" for every pixel. In other words, the image is scanned at the highest rate of resolution (definition).

At a step 407, the sub-scanning by means of the stepping motor 128 is decided to be made at the pitch of one step from the step "1" to the step "N".

At a step S408, an amount of image data corresponding to one line of sub-scanning steps is accumulated.

At a step S409, after completion of accumulation, the amounts of electric charges accumulated by the photodiodes 204(1 to M), 205(1 to M) and 206(1 to M) are decided to be transferred by the horizontal electric charge transfer parts 207, 208 and 209. Transfer in the direction of the main scanning is carried out for every pixel by the steps "1" to "M".

At the line CCD 119, the electric charges serially transferred from the horizontal electric charge transfer parts 207, 208 and 209 in the horizontal direction are converted by the vertical electric charge transfer part 210 (vertical CCD), for every pixel, into voltages through the buffer amplifier 211, and are supplied to the picked-up image signal processing circuit 120 through the output terminal (Vout) 212. The output of the picked-up image signal processing circuit 120 is supplied to the A/D converter 121 to be A/D converted into image data.

At a step S410, the image data obtained through the A/D converter 121 is taken into the system controller 101. The image data is then transferred to the high-definition image data storage area 103b of the RAM 103. The image data is thus stored at an address HImage(FC). The high-definition image data storage area 103b within the RAM 103 is arranged as described in the foregoing.

At a step S411, a check is made to find if the accumulation of electric charges for one main scanning line and the storing of the image data have been completed. If so, the flow of operation proceeds to a step S412. If not, the flow returns to the step S409 to execute again the processes of the step S409, i.e., to drive the horizontal electric charge transfer parts 207, 208 and 209 for every pixel, to vertically transfer the data of each pixel, to A/D convert the image data and to store the image data in the RAM 103.

At the step S412, a check is made to find if the sub-scanning steps from the step "1" to the step "N", at every step, have been completed. If so, the flow proceeds to a step S414. If not, the flow proceeds to a step S413.

At the step 413, the stepping motor 128 for the sub-scanning is driven by one step, and scanning shifts to the main scanning for a next line.

At the step S414, a rewinding action for the film 112 begins by driving the film winding shaft 111 with the motor 114.

At the step S415, the film counter (FC) is checked to find if the film has been rewound up to the first frame. If so, the flow proceeds to a step S416 to bring the driving action of the motor 114 to a stop.

At a step S417, the illumination light source 117 is turned off, and the flow returns to the main routine.

Figure 17:
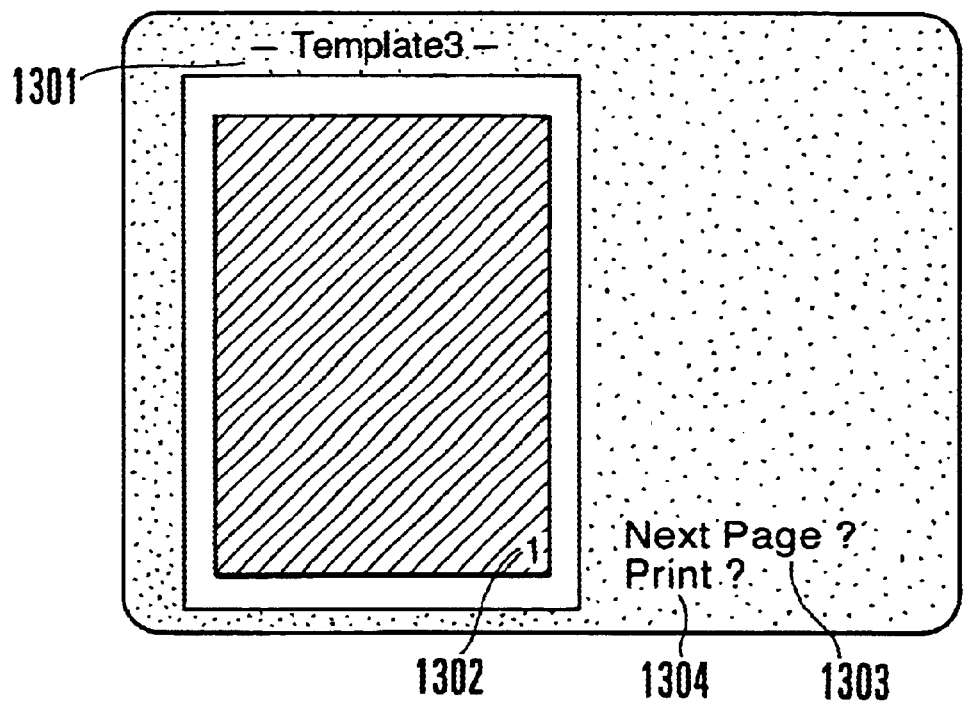
FIG. 17 shows a display made on the CRT according to the template 3.

At a step S214 of the main routine shown in FIG. 10, the template 3 is displayed on the CRT 109. Then, by making a reference to the template data table in the ROM 102, the image data obtained by the above-stated re-scanning subroutine of the step S213 is pasted on the template 3 in a predetermined area as shown in FIG. 17 and displayed on the CRT 109. In FIG. 17, reference numeral 1301 denotes the template 3 on display. Reference numeral 1302 denotes the frame number of the frame. Reference numerals 1303 and 1304 respectively denote indications urging a next page display process and a printing process.

The flow then proceeds to the step S211 described in the foregoing. At the step S211, the high-definition image data for one frame HImage(FC) obtained by the sub-scanning subroutine of the step 213 is written into the printing data buffer memory 108 at a predetermined address referring to the template data table which is as shown in FIG. 21.

For example, if the image data is for the frame number "1" as shown in FIG. 8, the image data occupies nearly the whole printing area within the template 3. The address within the printing data buffer memory 108 becomes a rectangular shape 801 defined by a diagonal between the coordinates (a6, b6) and the coordinates (a6 +M, b6 +N). Further, since both the main scanning and the sub-scanning are to be carried out at the scanning pitch "1", the image size becomes "M×N".

The flow comes from the step S205 or S211 to a step S220. At the step S220, a check is made to find if the printing process is selected. If so, the flow proceeds to a step S221.

Figure 18:
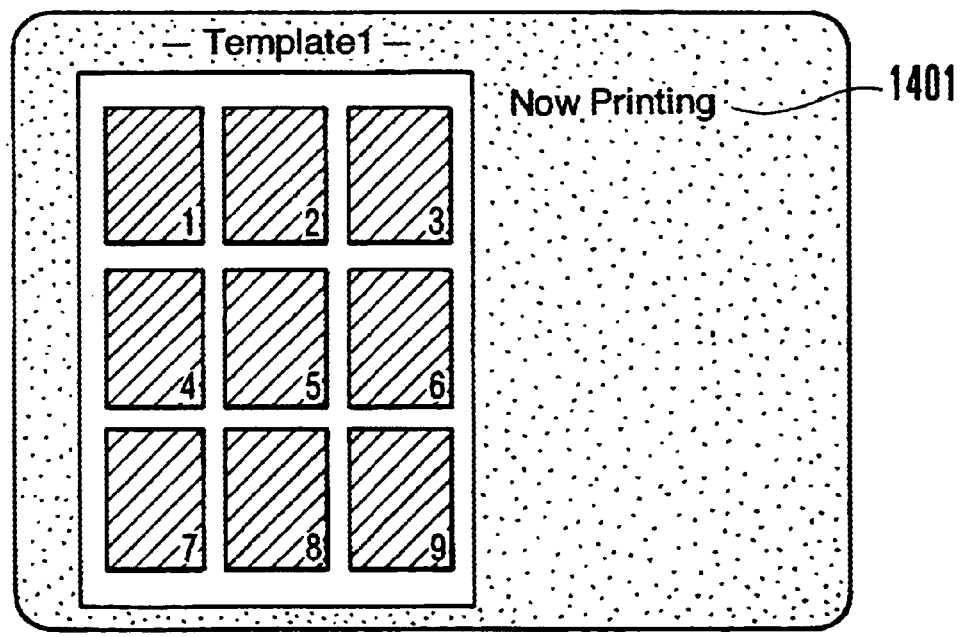
FIG. 18 shows a display made on the CRT indicating that printing is in process.
Figure 19:
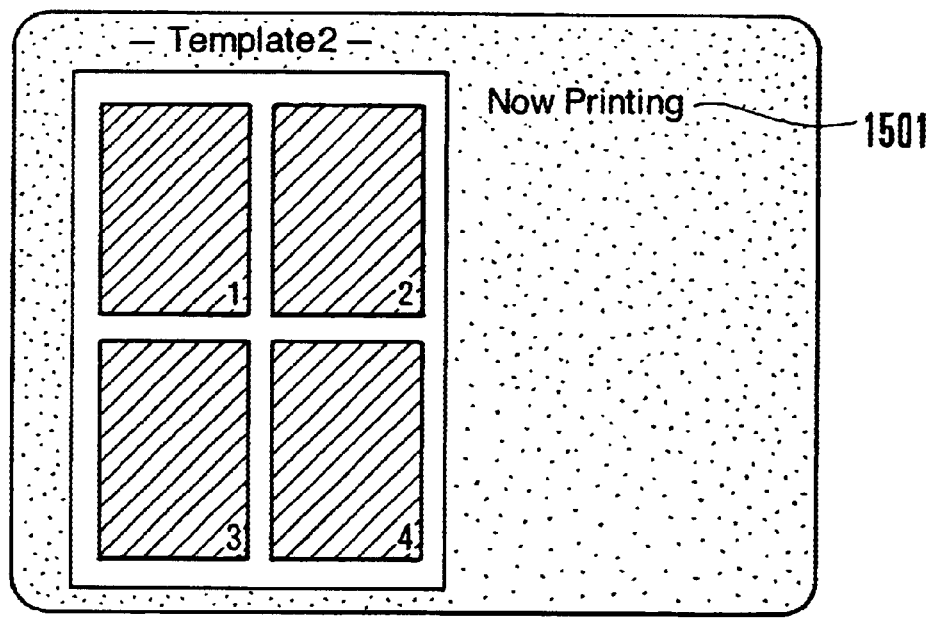
FIG. 19 shows another display made on the CRT indicating that printing is in process.
Figure 20:
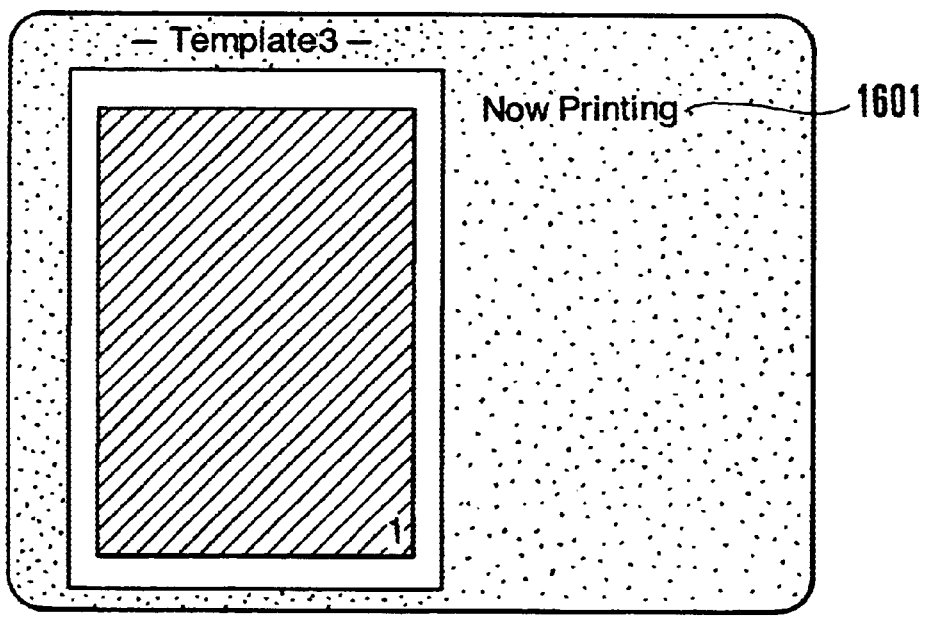
FIG. 20 shows a further display made on the CRT indicating that printing is in process.

At the step s221, the printer 106 is driven according to the contents of the printing data buffer memory 108 to print one page amount of image data. The details of the printing process are as follows. In response to the output of the printer driving circuit 107, the printer 106 performs a printing process by serially reading necessary image data out from the printing data buffer memory 108 and by transferring the data to a printing part which is not shown. The printer 106 is arranged not to print any pixel that has no data written into the printing data buffer memory 108. While the printer 106 is in process of printing, one of indications 1401, 1501 and 1601 indicating that printing is in process is provided as shown in FIGS. 18, 19 and 20.

In the case of the embodiment described above, the image pickup scanning system is arranged to scan images by moving the line CCD with the stepping motor. However, this invention is not limited to this arrangement. The arrangement may be changed, for example, to pick up the image at once by means of a two-dimensional-area type CCD and, in reading the image data, the accumulated electric charges are read out at a predetermined pitch both in the main scanning direction and the sub-scanning direction.

Further, while the embodiment is arranged to make color separation at the time of scanning by using the R, G and B color filters disposed respectively at the three-line CCD, this invention is not limited to this method. The color separation may be made by some other methods. For example, in a case where the image sensor is composed of a one-line CCD, three light sources which correspond to wavelengths of R (red), G (green) and B (blue) may be line-sequentially or plane-sequentially lighted up or optical systems having spectral transmission characteristics which correspond to the R, G and B wavelengths may be inserted and used by switching them from one over to another.

This invention may be carried out by combining as necessary the embodiment described and its modifications or their technological elements.

Further, this invention is applicable to cameras of varied kinds, such as a single-lens reflex camera, a lens-shutter type camera, a video camera, etc., optical apparatuses other than cameras, devices adapted for cameras, optical apparatuses and other apparatuses, and component elements forming these apparatuses and devices.

In the embodiment described above, the flow of operation of the system controller 101 shown in FIG. 10 corresponds to a resolution varying means (circuit). The flows of operation shown in FIGS. 14 and 16 correspond to a re-scanning means (circuit). The CCD 119 and the CCD driver 122 correspond to an image pickup means (element). The display shown in FIG. 12 corresponds to an indexing display. The displays shown in FIGS. 13, 15 and 17 correspond to a viewing display.

While the correlation of the various parts of the embodiment to those of this invention is as described above, this invention is of course not limited to the arrangement of the disclosed embodiment. This invention is intended to cover any of various modifications and other arrangements as long as the functions of arrangement of mechanisms and embodiments defined by the claims can be likewise carried out by them.

The embodiment is arranged, as described in the foregoing, to vary the image-data-scanning resolution according to the display size, etc. The scanning resolution is increased when the display size is large, so that a sharp image can be obtained on an ordinary viewing display. The scanning resolution is decreased when the display size is small, so that image data processing efficiency can be prevented from being lowered by processing redundant image data for the small display size. In a case where many image data is to be processed at the same time like in the case of an index display, the image data can be processed within a short period of time without necessitating a large storage capacity.

Further, an arrangement for scanning image data at a first (low) rate of resolution and, after that, scanning the image data again at a second rate of resolution which is higher than the first resolution enables the apparatus to make an index display at the first resolution within a short period of time and, after that, to make a sharp display at the second resolution in a case where it is necessary to make a viewing display in a size larger than an ordinary display size. Besides, in a case where a relatively smaller size is selected from among viewing display sizes, an arrangement for using image data scanned at the first resolution permits making a display in the selected size in a short period of time without having recourse to the process of re-scanning.

What is claimed is:

1. An image display control apparatus connected to an image pickup device capable of picking up a plurality of images comprising:

a memory capable of storing data of the plurality of images picked up by said pickup device;

a display control circuit arranged to process, for providing a display, the data of the plurality of images stored in said memory; and image pickup device controller for reducing a number of main-scanning pixels and a number of sub-scanning pixels read out from said pickup device according to the number of images to be displayed on one screen by said display control circuit.

2. An apparatus according to claim 1, further comprising a display device arranged to display at least one of the plurality of images by receiving an output of said display control circuit.

3. An apparatus according to claim 2, wherein said image pickup device controller is arranged to make an image scanning resolution to be employed by said pickup device higher accordingly as the number of images to be displayed on one screen by said display control circuit is fewer.

4. An apparatus according to claim 1, wherein said image pickup device controller is arranged to make an image scanning resolution to be employed by said pickup device higher accordingly as the number of images to be displayed on one screen by said display control circuit is fewer.

5. An apparatus according to claim 1, wherein said plurality of images are recorded on a recording medium.

6. An apparatus according to claim 5, wherein said recording medium is a film, and wherein said pickup device is capable of designating a frame to be picked up from among a plurality of frames recorded on the film.

7. An apparatus according to claim 6, wherein the film is wound in a roll-like shape within a cartridge, the film being pulled out from the cartridge so as to pickup an image recorded on the film and being rewound back into the cartridge upon completion of picking up the image.

8. An apparatus according to claim 1, wherein said memory is RAM, and a memory address in said RAM is designated according to the image scanning speed.

9. An image display apparatus connected to an image pickup device capable of picking up a plurality of images comprising:

a memory capable of storing data of the plurality of images picked up by said pickup device;

a display control circuit arranged to process, for providing a display, the data of the plurality of images stored in said memory; and a varying circuit arranged to vary an image scanning resolution to be employed by said pickup device, said varying circuit varying the image scanning resolution according to the number of images to be displayed on one screen by said display control circuit, said pickup device includes a line-shaped image pickup element, and wherein said varying circuit is arranged to vary a total number of pixels read out from said pickup device according to the number of images to be displayed on one screen by said display control circuit.

10. An image printing control apparatus connected to an image pickup device capable of picking up a plurality of images comprising:

a memory capable of storing data of the plurality of images picked up by said pickup device;

a printing control circuit arranged to process, for printing, the data of the plurality of images stored in said memory; and a varying circuit arranged to vary a total number of pixels read out from said pickup device according to the number of images to be printed on one sheet by said printing control circuit.

11. An apparatus according to claim 10, further comprising a printing device arranged to print at least one of the plurality of images by receiving an output of said printing control circuit.

12. An apparatus according to claim 11, wherein said varying circuit is arranged to make the image scanning speed to be employed by said pickup device higher accordingly as the number of images to be printed in one sheet by said printing control circuit is fewer.

13. An apparatus according to claim 10, wherein said varying circuit is arranged to make the image scanning speed to be employed by said pickup device higher accordingly as the number of images to be printed in one sheet by said printing control circuit is fewer.

14. An apparatus according to claim 10, wherein said memory is RAM, and a memory address in said RAM is designated according to the image scanning speed.

15. An apparatus according to claim 10, wherein said plurality of images are recorded on a recording medium.

16. An image printing control apparatus connected to an image pickup device capable of picking up a plurality of images comprising:

a memory capable of storing data of the plurality of images picked up by said pickup device;

a printing control circuit arranged to process, for printing, the data of the plurality of images stored in said memory; and a varying circuit arranged to vary an image scanning resolution to be employed by said pickup device, said varying circuit varying the image scanning resolution according to the number of images to be printed on one sheet by said printing control circuit, said pickup device includes a line-shaped image element, and wherein said varying circuit is arranged to vary a total number of pixels read out from said pickup device according to the number of images to be printed on one sheet by said printing control circuit.

17. An image display control apparatus connected to a scanning device capable of scanning an image by a line-shaped image picking up element comprising:

a memory capable of storing data of the image scanned by said scanning device;

a display control circuit arranged to process, for providing a display, the data of the image stored in said memory; and a varying circuit arranged to vary a total number of pixels read out from said line-shaped image picking up element according to a size of an image to be displayed by said display control circuit.

18. An apparatus according to claim 17, further comprising a display device arranged to display the image by receiving an output of said display control circuit.

19. An apparatus according to claim 17, wherein said image is recorded on a recording medium.

20. An apparatus according to claim 19, wherein said recording medium is a film, and wherein said pickup device is capable of designating a frame to be picked up from among a plurality of frames recorded on the film.

21. An apparatus according to claim 20, wherein the film is wound in a roll-like shape within a cartridge, the film being pulled out from the cartridge so as to allow picking up an image recorded on the film and being rewound back into the cartridge upon completion of picking up the image.

22. An apparatus according to claim 17, wherein said varying circuit is arranged to vary the scanning speed according to an enlarging rate of the image to be displayed by said display control circuit.

23. An apparatus according to claim 17, wherein said scanning device is capable of designating a frame to be scanned from among a plurality of frames recorded on a film.

24. An apparatus according to claim 23, wherein the relative movement between said line-shaped image picking up element and said film is effected by using a stepping motor as a drive source, and wherein said varying circuit is arranged to vary the scanning speed by varying the number of steps per one movement pitch of said stepping motor.

25. An apparatus according to claim 23, wherein the film is wound in a roll-like shape within a cartridge, the film being pulled out from the cartridge so as to allow picking up an image recorded on the film and being rewound back into the cartridge upon completion of picking up the image.

26. An apparatus according to claim 17, wherein the relative movement between said line-shaped image picking up element and a recording medium is effected by using a stepping motor as a drive source, and wherein said varying circuit is arranged to vary the scanning speed by varying the number of steps per one movement pitch of said stepping motor.

27. An apparatus according to claim 17, wherein said memory is a RAM, and a memory address in said RAM is designated according to the scanning resolution.

28. An image printing control apparatus connected to a scanning device capable of scanning an image by a line-shaped image picking up element comprising:

a memory capable of storing data of the image scanned by scanning device;

a printing control circuit arranged to process, for printing, the data of the image stored in said memory; and a varying circuit arranged to vary a total number of pixels read out from said line-shaped image picking up element according to a size of an image to be printed by said printing control circuit.

29. An apparatus according to claim 28, further comprising a printing device arranged to print the image by receiving an output of said printing control circuit.

30. An apparatus according to claim 28, wherein said varying circuit is arranged to vary the scanning resolution according to an enlarging rate of the image to be printed by said printing control circuit.

31. An apparatus according to claim 28, wherein said scanning device is capable of designating a frame to be picked up from among a plurality of frames formed on a film.

32. An apparatus according to claim 28, wherein said memory is a RAM, and a memory address in said RAM is designated according to the scanning resolution.

33. An apparatus according to claim 28, wherein the film is wound in a roll-like shape within a cartridge, the film being pulled out from the cartridge so as to allow picking up an image recorded on the film and being rewound back into the cartridge upon completion of scanning the image.

34. An apparatus according to claim 28, wherein said image is recorded on a recording medium.

35. A method of controlling displaying of a plurality of images by an image display control apparatus connected to an image pickup device capable of picking up the plurality of images comprising the steps of:

storing data of the plurality of images picked up by said pickup device in memory;

processing by a display control circuit the data of the plurality of images stored in said memory to provide a display; and varying by a varying circuit, an image scanning resolution to be employed by said pickup device including a line-shaped image pickup element, varying the image scanning resolution according to the number of images to be displayed on one screen by said display control circuit, and varying a total number of pixels read out from said pickup device according to the number of images to be displayed on one screen by said display control circuit.

36. A method for controlling printing of a plurality of images by an image printing control apparatus connected to an image pickup device capable of picking up the plurality of images comprising the steps of:

storing data of the plurality of images picked up by said pickup device in memory;

processing by a printing control circuit the data of the plurality of images stored in said memory for printing; and varying by a varying circuit, an image scanning resolution to be employed by said pickup device including a line-shaped image element, varying the image scanning resolution according to the number of images to be printed on one sheet by said printing control circuit, and varying a total number of pixels read out from said pickup device according to the number of images to be printed on one sheet by said printing control circuit.

37. A method for controlling displaying of an image by an image display control apparatus connected to a scanning device capable of scanning the image by a line-shaped image picking up element comprising the steps of:

storing data of the image scanned by said scanning device in memory;

processing by a display control circuit the data of the image stored in said memory for providing a display; and varying by a varying circuit, a total number of pixels read out from said line-shaped image picking up element according to a size of an image to be displayed by said display control circuit.

38. A method for controlling printing of an image by an image printing control apparatus connected to a scanning device capable of scanning the image by a line-shaped image picking up element comprising the steps of:

storing data of the image scanned by said scanning device in memory;

processing by a printing control circuit the data of the image stored in said memory for printing; and varying by a varying circuit, a total number of pixels read out from said line-shaped image picking up element according to a size of an image to be printed by said printing control circuit.

39. A computer-readable memory medium storing computer-executable process steps to perform a display control method, the process steps comprising the steps of:

storing data of a plurality of images picked up by a pickup device;

processing by a display control circuit the stored data of the plurality of images to provide a display; and varying by a varying circuit, an image scanning resolution to be employed by said pickup device including a line-shaped image pickup element, varying the image scanning resolution according to the number of images to be displayed on one screen by said display control circuit, and varying a total number of pixels read out from said pickup device according to the number of images to be displayed on one screen by said display control circuit.

40. A computer-readable memory medium storing computer-executable process steps to perform a printing control method, the process steps comprising the steps of:

storing data of a plurality of images picked up by a pickup device;

processing by a printing control circuit the stored data of the plurality of images for printing; and varying by a varying circuit, an image scanning resolution to be employed by said pickup device including a line-shaped image element, varying the image scanning resolution according to the number of images to be printed on one sheet by said printing control circuit, and varying a total number of pixels read out from said pickup device according to the number of images to be printed on one sheet by said printing control circuit.

41. A computer-readable memory medium storing computer-executable process steps to perform a display control method, the process steps comprising the steps of:

storing data of an image scanned by a scanning device;

processing by a display control circuit the stored data of the image for providing a display; and varying by a varying circuit, a total number of pixels read out from said line-shaped image picking up element according to a size of an image to be displayed by said display control circuit.

42. A computer-readable memory medium storing computer-executable process steps to perform a printing control method, the process steps comprising the steps of:

storing data of an image scanned by a scanning device;

processing by a printing control circuit the stored data of the image for printing; and varying by a varying circuit, a total number of pixels read out from said line-shaped image picking up element according to a size of an image to be printed by said printing control circuit.

* * * * *

UNITED STATES PATENT AND TRADEMARK OFFICE
CERTIFICATE OF CORRECTION

PATENT NO. : 6,636,330 B2
DATED : October 21, 2003
INVENTOR(S) : Koichi Matsumura It is certified that error appears in the above-identified patent and that said Letters Patent is hereby corrected as shown below:

Column 2,
Line 66, delete "sys em" and insert -- system --.

Column 3,
Line 16, delete "ill" and insert -- 111 --.

Column 10,
Line 10, delete "113" and insert -- 119 --.

Signed and Sealed this

Thirty-first Day of August, 2004

JON W. DUDAS
*Director of the United States Patent and Trademark Office*